United States Patent [19]

Hagiya et al.

[11] Patent Number: 5,086,422
[45] Date of Patent: Feb. 4, 1992

[54] OPTICAL DISK APPARATUS

[75] Inventors: Toshimichi Hagiya, Hadano; Junichi Watanabe, Yokohama; Tetsuo Kanno, Ebina; Hideo Inuzuka, Yokohama; Makoto Yamahata, Fukuoka; Masaaki Sofue, Hadano; Yoshiaki Aota, Atusgi, all of Japan

[73] Assignee: Ricoh Company, Ltd., Tokyo, Japan

[21] Appl. No.: 529,235

[22] Filed: May 25, 1990

[30] Foreign Application Priority Data

| Jun. 19, 1989 | [JP] | Japan | 1-154463 |
| Jun. 20, 1989 | [JP] | Japan | 1-155764 |
| Aug. 9, 1989 | [JP] | Japan | 1-204596 |
| Oct. 17, 1989 | [JP] | Japan | 1-120593 |

[51] Int. Cl.$^5$ .......... G11B 33/02; G11B 3/58; G11B 5/012
[52] U.S. Cl. .......... 369/75.1; 369/71; 369/72; 360/97.03
[58] Field of Search .......... 369/71, 72, 73, 75.1, 369/274, 291, 292, 75.2, 77.1, 77.2; 360/97.2, 97.3, 97.4, 98.02, 97.02, 97.03; 277/23-237 A, DIG. 4, 901; 312/223-229, 236, 220-220.5; 98/1, 36

[56] References Cited

U.S. PATENT DOCUMENTS

| 4,339,777 | 6/1982 | Gruczelak | 360/97.02 |
| 4,389,717 | 6/1983 | Camerik | 369/111 |
| 4,489,356 | 12/1984 | Farmer | 369/72 |
| 4,581,668 | 4/1986 | Campbell | 369/72 |
| 4,692,827 | 9/1987 | Biermeier et al. | 360/97.03 |
| 4,711,412 | 9/1988 | Aihara et al. | 369/75.1 |
| 4,725,904 | 2/1988 | Dazziel | 360/97.02 |
| 4,780,776 | 10/1988 | Dushkes | 360/97.03 |
| 4,847,711 | 6/1989 | Inoue | 369/72 |
| 4,866,693 | 4/1989 | Odawara et al. | 369/75.2 |

FOREIGN PATENT DOCUMENTS

| 0134419 | 3/1985 | European Pat. Off. | 369/292 |
| 202591 | 10/1985 | Japan . | |
| 142589 | 6/1986 | Japan . | |
| 0295291 | 12/1987 | Japan | 369/75.1 |
| 293783 | 11/1988 | Japan . | |
| 8546 | 1/1989 | Japan . | |

Primary Examiner—Stuart S. Levy
Assistant Examiner—Tan Nguyen
Attorney, Agent, or Firm—Cooper & Dunham

[57] ABSTRACT

An optical disk apparatus for an optical disk enclosed in a disk cartridge comprises a casing for accommodating the cartridge through a cassette insertion aperture formed therein. A disk drive motor for rotating the optical disk, a loading assembly for detachably loading the cartridge on the disk drive motor, and an optical pickup device for recording data on and/or reproducing data from the optical disk are provided in the casing. Deflecting member provided for sealing the periphery of the optical pickup device against the flow of outside air introduced in the casing. A specific air-seal or door structure is provided for preventing introduction of air from the cassette insertion aperture into the casing. In the case that the optical pickup device comprises an optical head casing and an optical system accommodated in the optical head casing, the optical head casing is provided with air-supply means for supplying pressurized air into the optical head casing to maintain the interior of the optical head casing at a pressure higher than the exterior thereof.

11 Claims, 20 Drawing Sheets

OPTICAL DISK APPARATUS

BACKGROUND OF THE INVENTION

The present invention relates to an optical disk apparatus for an optical disk enclosed in a disk cartridge which is to be detachably inserted thereinto. More particularly, the invention relates to a dustproof structure for protecting an optical system of a optical pickup device disposed in a casing from dust contained in the atmosphere.

Generally, an optical disk apparatus for recording data on an optical disk and/or reproducing data from the same is equipped with various drive sources such as, for example, a disk drive motor for rotating the optical disk, a linear motor for moving an optical pickup device in the radial direction of the optical disk, as well as a semiconductor laser which is used as a light source of the optical pickup device and drive circuit elements for driving the drive sources and the light source. The heat generated from the drive and light sources and the drive circuit elements therefor, can raise the inside temperature of a standard type of optical disk apparatus by several tens of centigrade degrees.

Such a temperature, an optical disk or a semiconductor laser and shorten the service life thereof. Accordingly, it has been common to cool an apparatus such as drive unit using an optical disk apparatus with an air-intake fan.

On the other hand, generally, the optical disk apparatus for use with an optical disk enclosed in a insertable disk cartridge comprises a casing for accommodating the cartridge through a cartridge insertion aperture. A disk drive motor for rotating the optical disk, a loading assembly for detachably loading the cartridge on a disk drive motor, and an optical pickup device having an optical system such as objective lens for focusing a light beam on the optical disk are disposed in the casing. A slight gap is ensured between the optical disk and the objective lens of the optical pickup device so that the cartridge can be exchanged to another one.

In order to perform forced air-cooling in the casing, an air-inlet and air-outlet, each covered with a dust filter, are formed in the casing at its front and rear panel sections, respectively. Much of the of dust can be caught with the filter at the air-inlet.

Further, when the cartridge is pulled out from the casing through the cassette insertion aperture which is generally formed in the front panel of the casing, the cassette insertion aperture can be closed with the door member which is, in general, pivotally provided at the inside of the front panel section of the casing. However, when the cartridge is inserted into the casing through the cassette insertion aperture and is then loaded on the disk drive motor, the door member is maintained in its aperture-opening position by means of the cartridge. Accordingly, dust may be introduced into the case particularly through the cassette insertion aperture.

In such a construction of the optical pickup device, when forced air-cooling is performed in the casing, dust introduced into the casing ma flow through gaps between constituent parts within the casing, particularly through gaps between the constituent parts of the loading assembly and a gap between the cartridge and the loading assembly and, then, arrive at optical parts such as the objective lens, resulting in the contamination or pollution of the optical parts by adhesion of dust thereon.

As a result, an optical wave surface in the optical system is distorted, and thus the focusing efficiency or the data detection characteristics of the optical pickup device could suffer. Therefore, the reliability of the optical disk apparatus could be decreased due to frequent occurrence of data errors.

SUMMARY OF THE INVENTION

It is therefore an object of the present invention to provide an optical disk apparatus having an improved dustproof structure.

Another object of the present invention is to provide an optical disk apparatus which can keep dust from adhering to optical parts of the optical system while ensuring effective air-cooling in the interior of the optical disk apparatus.

According to one aspect of the present invention the above-mentioned objects can be achieved by an optical disk apparatus for an optical disk enclosed in a disk cartridge which is to be detachably inserted thereinto, comprising:

a casing for accommodating the cartridge through a cassette insertion aperture formed therein;

a disk drive motor for driving the optical disk in the cartridge for rotation about the center thereof within the casing;

a loading assembly for detachably loading the cartridge on the disk drive motor within the casing;

an optical pickup device for recording data on and/or reproducing data from the optical disk; and a deflecting means for sealing the periphery of the optical pickup device against the flow of air introduced in the casing from the exterior thereof.

In the above-mentioned construction of the invention, passage of air led to the optical pickup device can be blocked by the periphery sealing means, and thus the flow of air can move around the periphery of the optical pickup device. Therefore, it is possible to keep dust from adhering to optical parts of the optical system while ensuring effective air-cooling in the interior of the optical disk apparatus casing, and thus improved dustproofing can be achieved According to another aspect of the present invention, the above-mentioned objects can be achieved by an optical disk apparatus for an optical disk enclosed in a disk cartridge which is to be detachably inserted thereinto, comprising:

a casing for accommodating the cartridge through a cassette insertion aperture formed therein;

a disk drive motor for driving the optical disk in the cartridge for rotation about the center thereof within the casing;

a loading assembly for detachably loading the cartridge on the disk drive motor within the casing;

an optical pickup device for recording data on and/or reproducing data from the optical disk;

a door member for closing the cassette insertion aperture of the casing, the door member being pivotally provided at the inside of the casing and urged with spring means toward its aperture-closing position from its aperture-opening position so as to be pivotally moved from its aperture-closing position to its aperture-opening position by means of the cartridge against the force of the spring means when the cartridge is inserted into the casing through the cassette insertion aperture;

door seal members which together are adapted to form an air-tight seal between the door member and the casing when the door is in its aperture-opening position and the cartridge is loaded o the disk drive motor; and cartridge seal members which is adapted to form an air-tight seal between the cartridge and the casing at the side opposite to the door member when the door is in its aperture-opening position and the cartridge is loaded on the disk drive motor.

In the above-mentioned construction, when the door member is in its aperture-opening position, the communication of the cassette insertion aperture with the interior of the casing can be interrupted by means of the door seal means and the cartridge seal means. Accordingly, it is possible to prevent introduction of air, as well as dust contained in the air, from the exterior of the casing into the casing through the cassette insertion aperture, and thus improved dustproofing can be achieved while ensuring effective air-cooling in the interior of the optical disk apparatus casing by using an air-inlet formed in place in the casing and covered with a dust-filter According to further aspect of the present invention, the above-mentioned objects can be achieved by an optical disk apparatus for an optical disk enclosed in a disk cartridge which is to be detachably inserted thereinto, comprising:

a casing for accommodating the cartridge through a cassette insertion aperture formed therein;

a disk drive motor for driving the optical disk in the cartridge for rotation about the center thereof within the casing;

a loading assembly for detachably loading the cartridge on the disk drive motor within the casing;

an optical pickup device, having an optical system, for recording data on and/or reproducing data from the optical disk through the optical system; and a door member for closing the cassette insertion aperture of the casing, the door member being pivotally supported on the casing and urged with spring means toward its aperture-closing position from its aperture-opening position so as to be pivotally moved from its aperture-closing position to its aperture-opening position by means of the cartridge against the force of the spring means when the cartridge is inserted into the casing through the cassette insertion aperture, the door member being brought into surface contact with the cartridge when the door member is in its aperture-opening position and being movable along the direction of moving of the cartridge between its loaded and unloaded positions with respect to the disk drive motor, the loading assembly being provided with a pushing member which is adapted to push the door member together with the cartridge in the same direction when the cartridge is loaded on the disk drive motor, and wherein the door member is further provided with a plate member which extends radially from the pivotal axis of the door member in a direction perpendicular to the door member so as to be brought into surface contact with the inside of the casing when the door member is in its aperture-opening position and thereby to close the cassette insertion aperture when the cartridge is loaded on the disk drive motor.

In the above-mentioned construction, when the cartridge is loaded on the disk drive motor within the casing, the cassette insertion aperture is closed by the plate member secured to the door member. Further, sealing between the door member and the cartridge can be increased by the surface contact of the door member with the cartridge. Accordingly, it is possible to prevent introduction of air, as well as dust contained in the air, from the exterior into the casing through the cassette insertion aperture, and thus improved dustproofing can be achieved while ensuring effective air-cooling in the interior of the optical disk apparatus casing by using an air-inlet formed in place in the casing and covered with a dust-filter.

According to furthermore aspect of the present invention, the above-mentioned objects can be achieved by an optical disk apparatus for an optical disk enclosed in a disk cartridge which is to be detachably inserted thereinto, comprising:

a casing for accommodating the cartridge through a cassette insertion aperture formed therein;

a disk drive motor for driving the optical disk in the cartridge for rotation about the center thereof within the casing; and an optical pickup device for recording data on and/or reproducing data from the optical disk, the optical pickup device comprising a optical head casing and an optical system accommodated in the optical head casing, the optical head casing being provided with air-supply means for supplying pressurized air into the optical head casing to maintain the interior of the optical head casing at a pressure higher than the exterior thereof.

In the above-mentioned construction, since the interior of the optical head casing of the optical pickup device is maintained at pressure higher than the exterior thereof, i.e., the interior of the optical disk apparatus casing, it is possible to prevent introduction of air into the optical head casing and thereby to keep dust from optical parts of the optical system while ensuring effective air-cooling in the interior of the optical disk apparatus casing.

Further objects, features and advantages of the present invention will become apparent from the following description of the preferred embodiments of the present invention as illustrated in the accompanying drawings.

DESCRIPTION OF THE PREFERRED EMBODIMENTS

FIGS. 1 to 10 show a first embodiment of the present invention.

Figure 1:
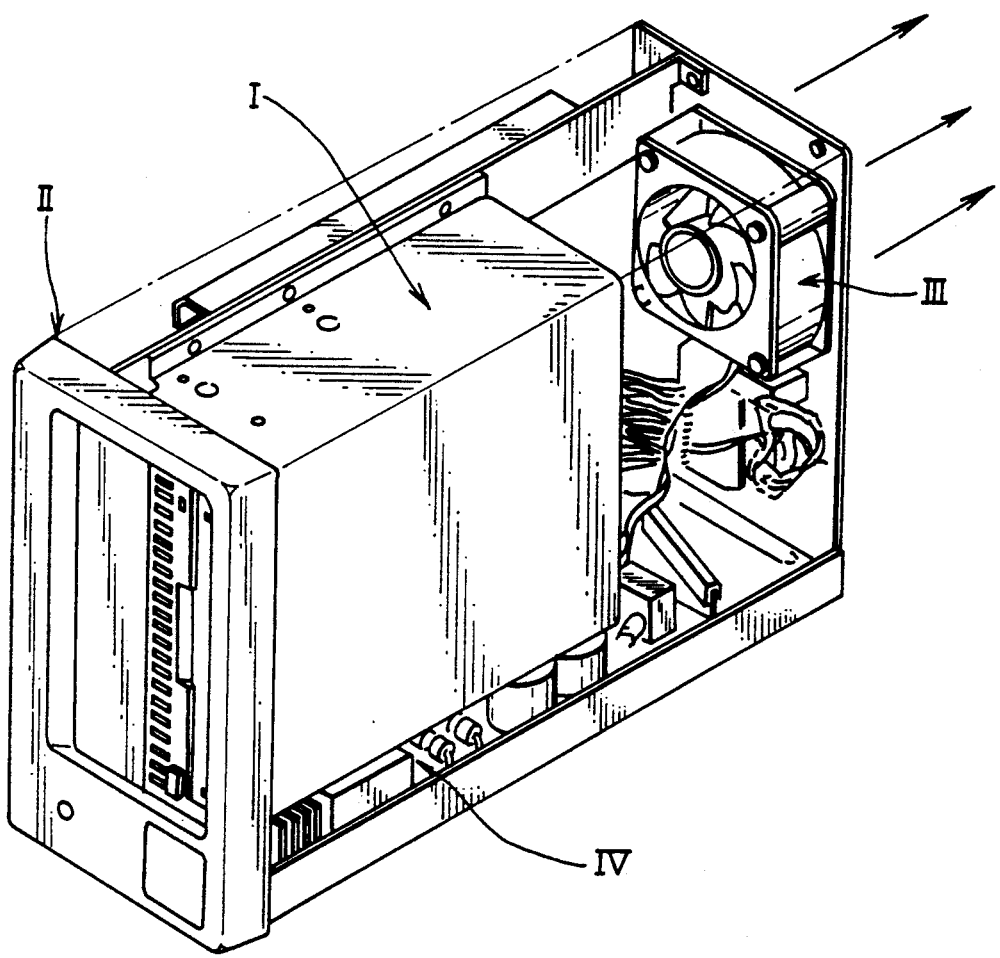
FIG. 1 is a fragmentary perspective view showing an optical disk apparatus which is accommodated in the unit case for forced air-cooling.

Referring first to FIG. 1, there is shown an optical disk apparatus I which is accommodated in the disk drive unit II. An air-intake fan III and an electric power unit IV for supplying power to the optical disk apparatus I and the fan III are also accommodated in the disk drive unit II.

Figure 2:
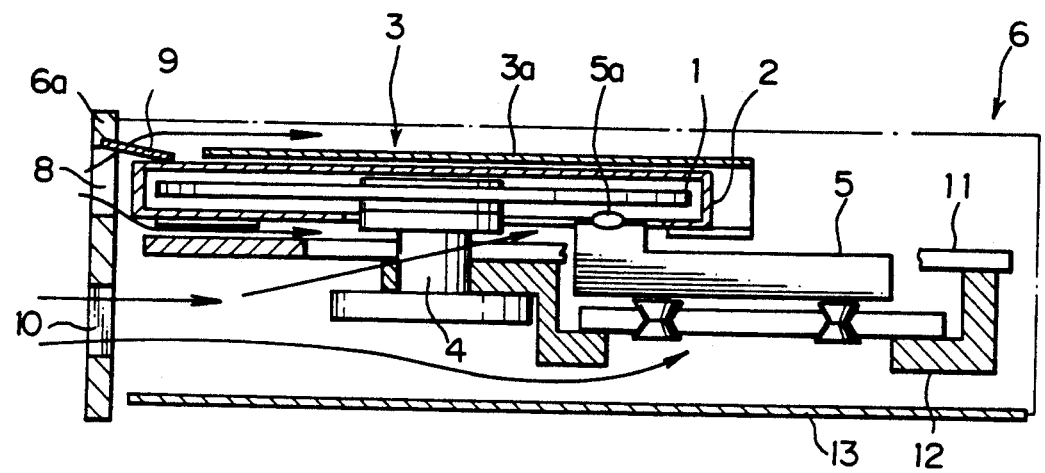
FIG. 2 is a schematical section view of a first embodiment of an optical disk apparatus, which is constructed in accordance with one aspect of the present invention, illustrating a cartridge loaded on a disk drive motor within a casing.
Figure 3:
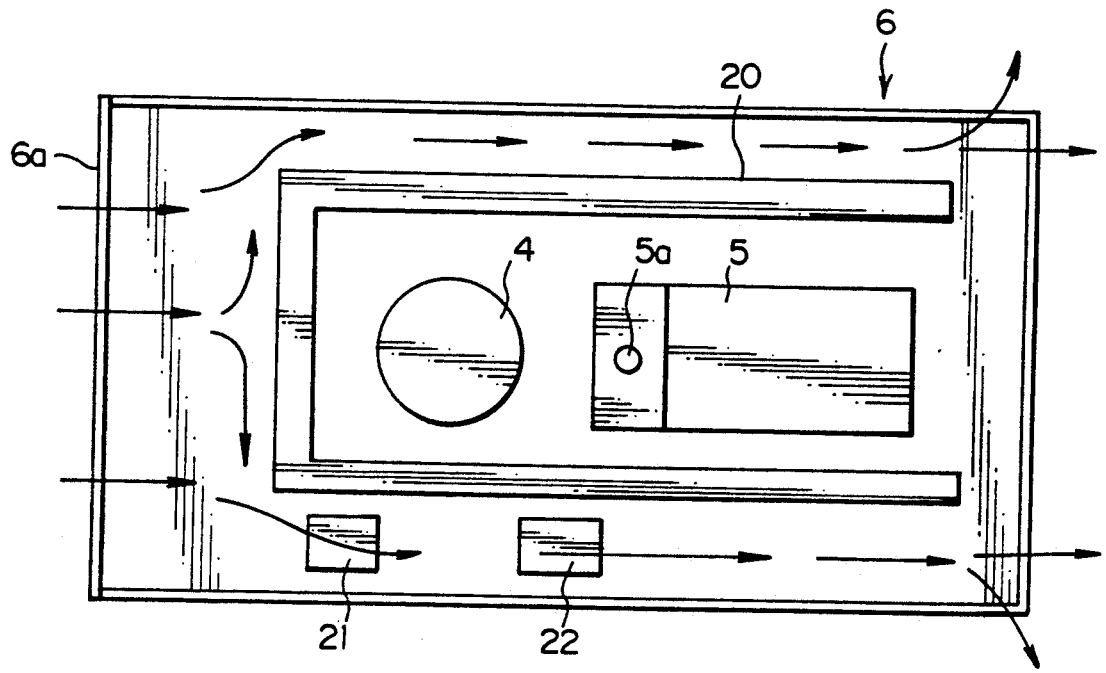
FIG. 3 is a schematical plan view of the interior of the optical disk apparatus shown in FIG. 2, illustrating a cartridge-surface seal member.
Figure 4:
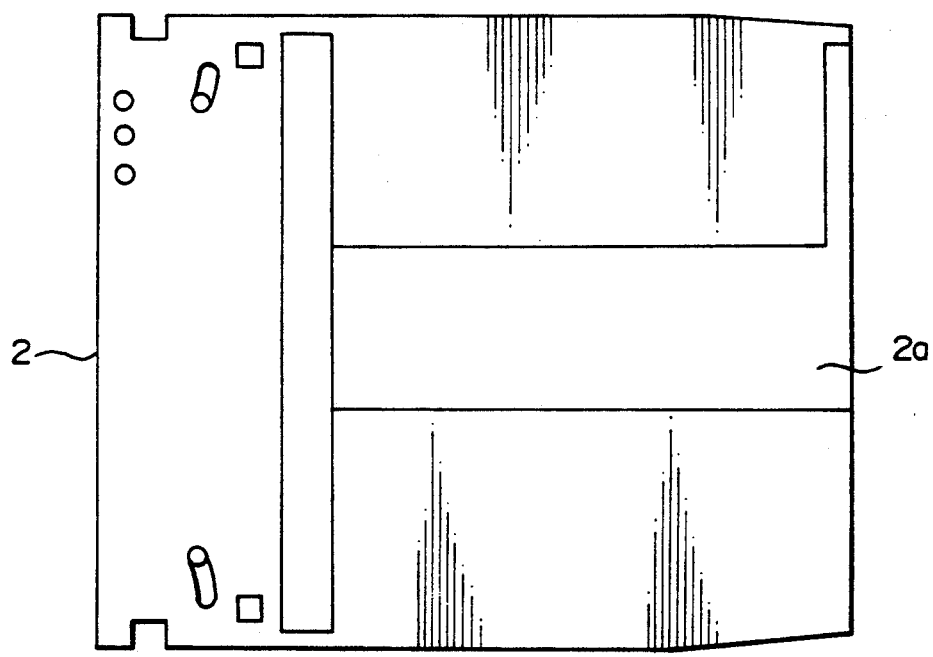
FIG. 4 is a schematical plan view of a disk cartridge as an example.

FIGS. 2 and 3 schematically show an internal structure of the optical disk apparatus II for recording data on and/or reproducing data from a optical disk 1 which is housed in a disk cartridge 2. The apparatus II comprises a casing 6 for accommodating therein a cartridge 2 through a cassette insertion aperture 8 which is formed in a front panel section 6a of the casing 6. A disk drive motor such as spindle motor 4 for rotating the optical disk 1, a loading assembly 3 for detachably loading the cartridge 2 on the disk drive motor 4, and an optical pickup device 5 are disposed in the casing 2.

In FIG. 2, the disk cartridge 2 is inserted into a tray 3a of the loading assembly 3 and is loaded on the motor 4. In this state, the optical disk 1 can be rotated by the motor 4, and the optical pickup device 5 can be moved by a linear motor (not shown) in the radial direction of the optical disk 1 to perform data accessing to the recording surface of the optical disk 1.

The casing 6 is provided at the inside of the front panel section 6a with a door member 9 for closing the cassette insertion aperture 8 formed in the front panel section 6a. The front panel section 6a is also formed with an air-inlet 10 for introducing air from the exterior into the casing 6.

A base plate 11 and a base member 12 which constitute a mounting base for mounting thereon the disk drive motor 4 and the optical pickup device 5 are disposed in the casing 6 and fixed thereto. The interior of the casing 6 is generally separated into upper and lower sections by the base plate 11. The loading assembly 3 is disposed in the upper section of the interior of the casing 6 and opposes to the motor 4 and the optical pickup device 6 through an aperture 11a formed in the base plate 11. A circuit board 13 for driving is disposed in the lower section of the interior of the casing 6.

In the above-described construction, as the fan III is activated to discharge air in the unit II toward the exterior thereof, the atmosphere or air is introduced into the case 6 through the cassette insertion aperture 8, a gap between the front panel 6a and the door member 9, and the air-inlet 10.

The air introduced into the casing 6 may flow through a gap between elements of the loading assembly 3, a gap between the disk cartridge 2 and the loading assembly 3, a gap between the loading assembly 3 and the base plate 11, a gap between the base plate 11 and the spindle motor 4, a gap between the base member 12 and the circuit board 13 etc., and is then brought into contact with optical parts such as an objective lens 5a of the optical pickup device 5.

Therefore, dust contained in the air may adhere to the optical parts surface, reducing reliability of data recording and/or reproduction.

In order to keep dust from the optical parts, seal members are arranged at appropriate positions so as to seal the optical pickup device 5 against the flow of air air within the casing 6.

On the other hand, in order to prevent the internal temperature of the optical disk apparatus from rising by applying forced air-cooling to the interior of the casing, it is desirable to guide the flow of air toward heat sources 21 and 22 such as integrated circuits which serve as driving circuits. For this reason, a U-shaped seal member 20 is arranged in contact with the disk cartridge 2, as shown in FIG. 3.

In this case, however, the disk cartridge 2 is considered to be deformed by deflection of the deflecting member 20, since the latter is brought into tight contact with the disk cartridge 2. In order to solve this inconvenience, the seal member 20 may be arranged at a position where the disk cartridge 2 is hard to deform, for example, at a position apart from the spindle motor 4 at a certain distance. Furthermore, if a gap between the disk cartridge 2 and the deflecting member 20 is not more than about 0.5 mm, the seal member 20 can serve as a good dustproofing element.

Next, explanation will be made in more detail as to one embodiment of the invention with reference to FIGS. 4 to 10.

Figure 5:
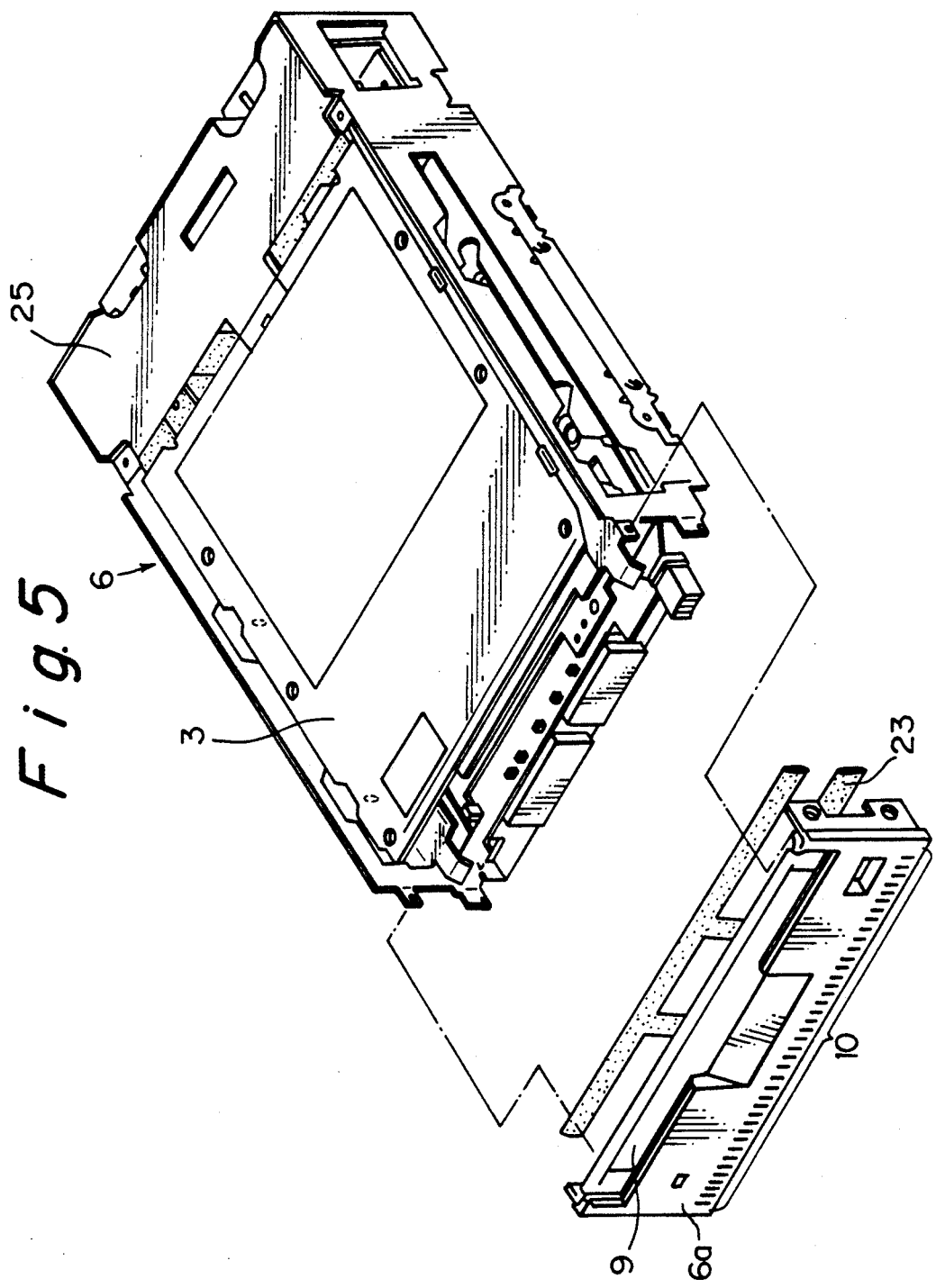
FIGS. 5 to 10 are partly exploded perspective view of the optical disk apparatus shown in FIG. 1.

Referring now to FIG. 5, a dustproofing structure is applied to the front panel 6a. Namely, a filter member 23 is disposed at the inside of the air-inlet 10. As the filter member 23, an air-filter material having electrification property may be used.

Figure 6:
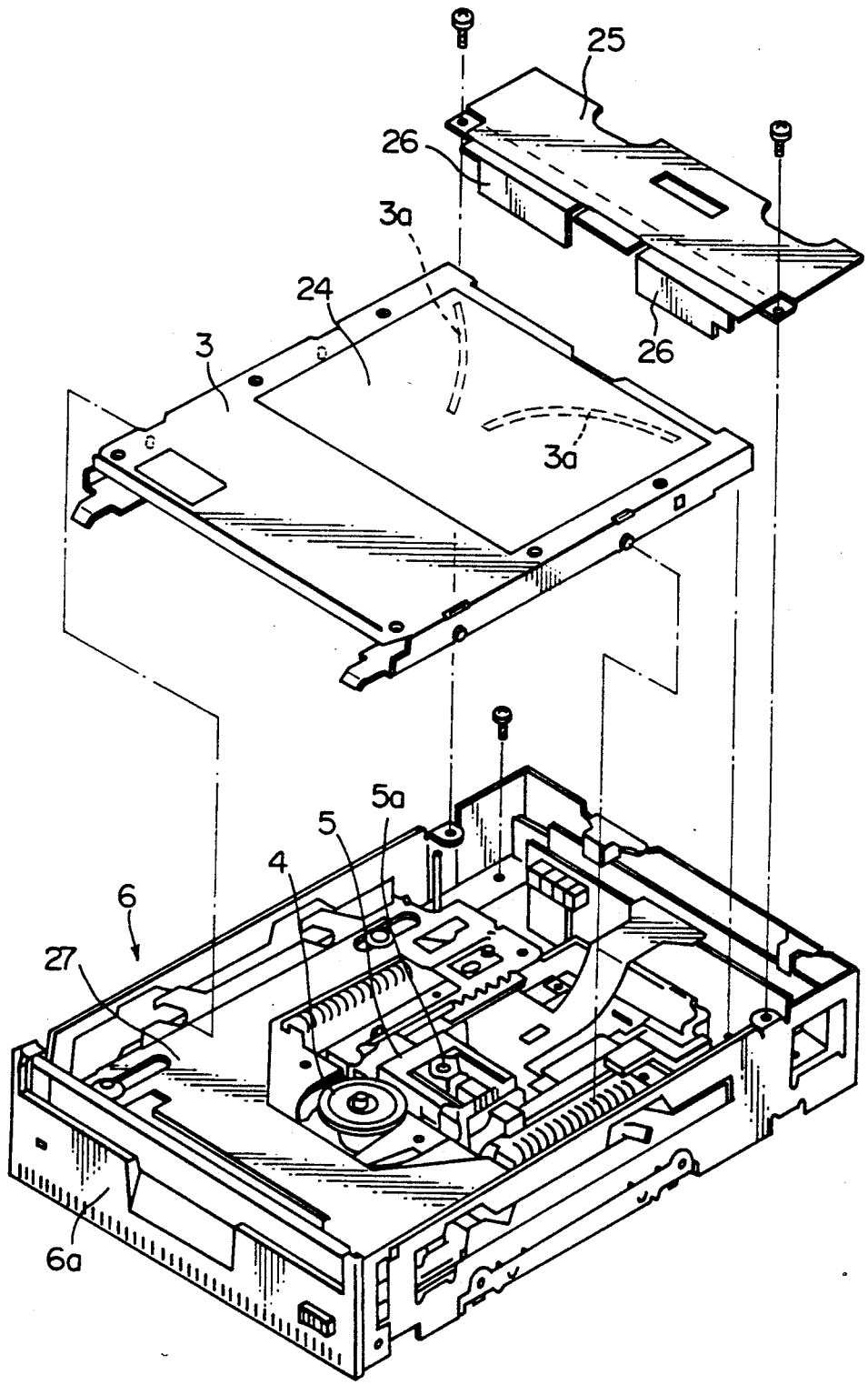

FIG. 6 illustrates a dustproofing structure applied to the tray 3a. The tray 3a is formed with guide holes 3a, 3b for guiding a mechanism for opening and closing a shutter 2a (see FIG. 4) of the disk cartridge 2 and is provided with a dustproofing sheet member 24 for covering the guide holes 3a, 3b.

Installed at the backside of the tray 3a is a cover 25 for covering the upper surface of the casing 6. The cover 25 is arranged at its forward end with a dustproofing sheet member 26 for blocking a gap between the tray 3a and the cover 25.

The tray 3a is engaged with a carrier 27 of the loading assembly 3, which is guided and supported by the base plate 11. In response to the forward and backward movement of the carrier 27, the tray 3a moves vertically, whereby the disk cartridge 2 is detachable with respect to the spindle motor 4.

Figure 7:
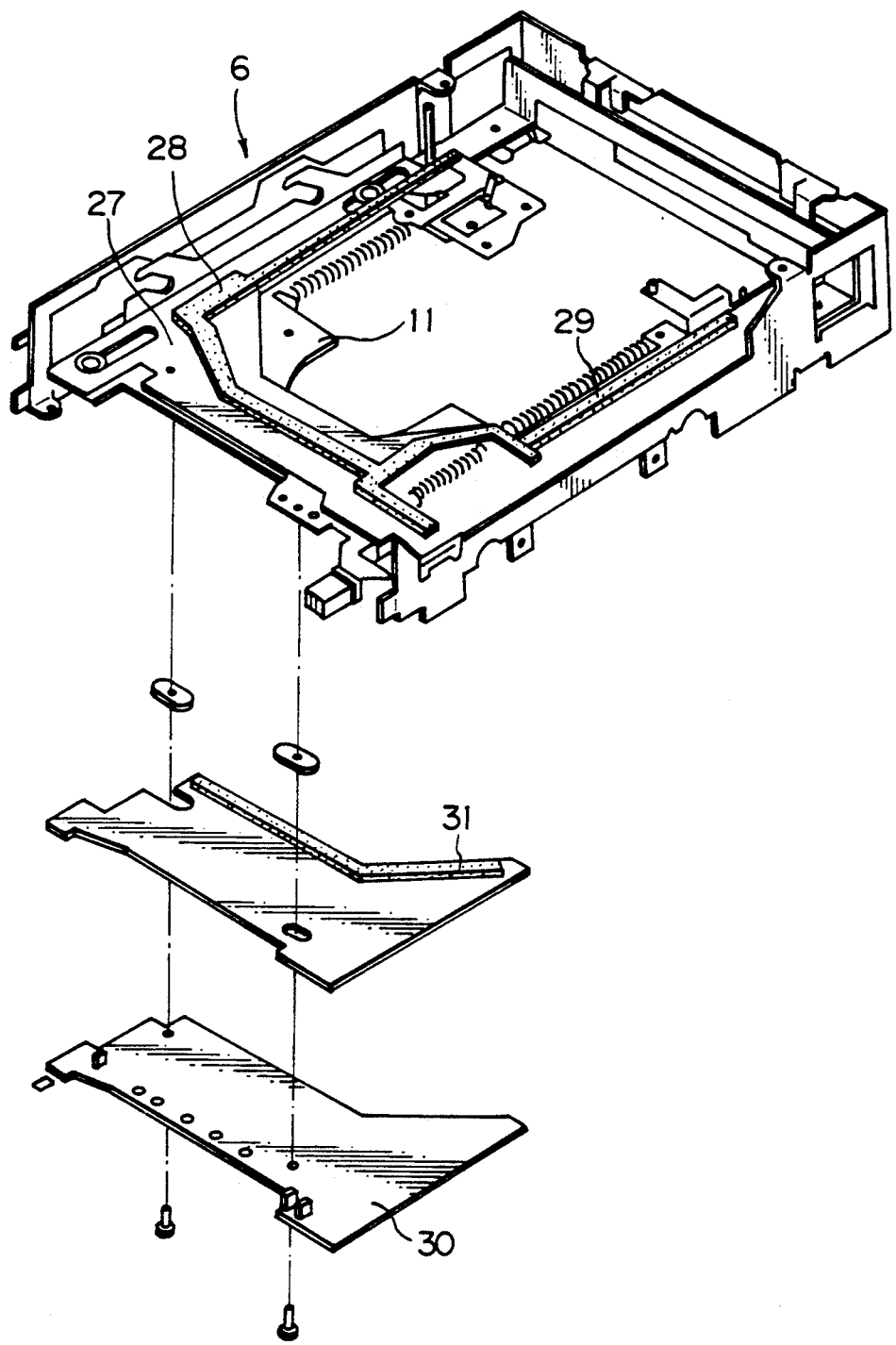

FIG. 7 illustrates a dustproofing structure applied to the carrier 27. Disposed around the opening of the carrier 27 are seal members 28 and 29 which are adapted to be brought into contact with the cartridge 2 when the cartridge 2 is loaded on the disk drive motor 4. The sealing member 28 and 29 together correspond to the seal member 20 shown in FIG. 2.

Disposed at the lower surface of the base plate 11 is a seal member 31 for filling up a gap between a sensor substrate 30 and the base plate 11.

Figure 8:
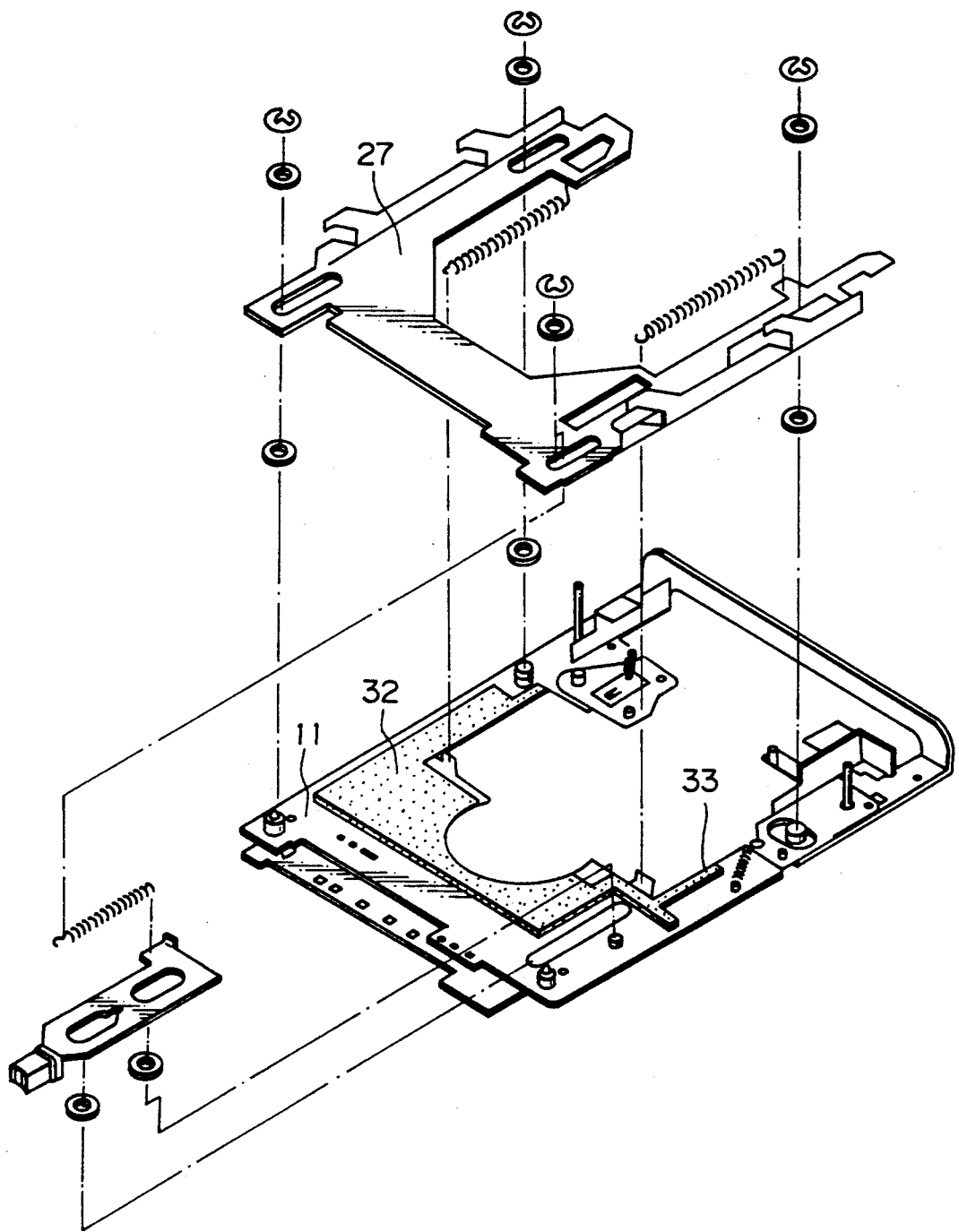

FIG. 8 illustrates a dustproofing structure applied to a gap between the carrier 27 and the base plate 11. Provided around the position where the spindle motor 4 is disposed on the base plate 11 are dustproof seal members 32 and 33 which fill up a gap between the base plate 11 and the carrier 27.

Figure 9:
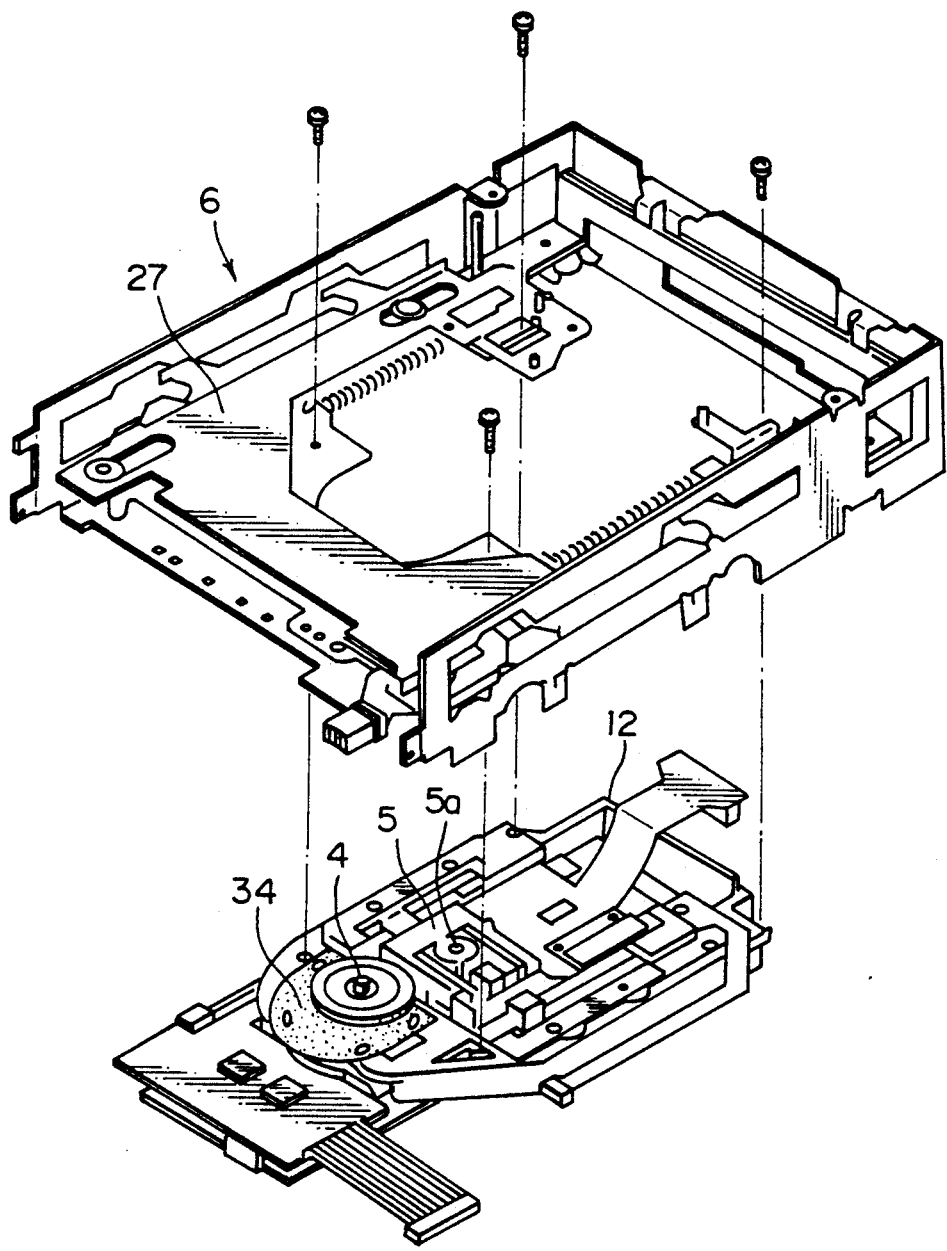

FIG. 9 illustrates a dustproofing structure applied to a gap between the spindle motor 4 and the base plate 11. A dustproof seal member 34 is provided around the spindle motor 4 so as to fill up the gap between the base member 12 and the base plate 11.

Figure 10:
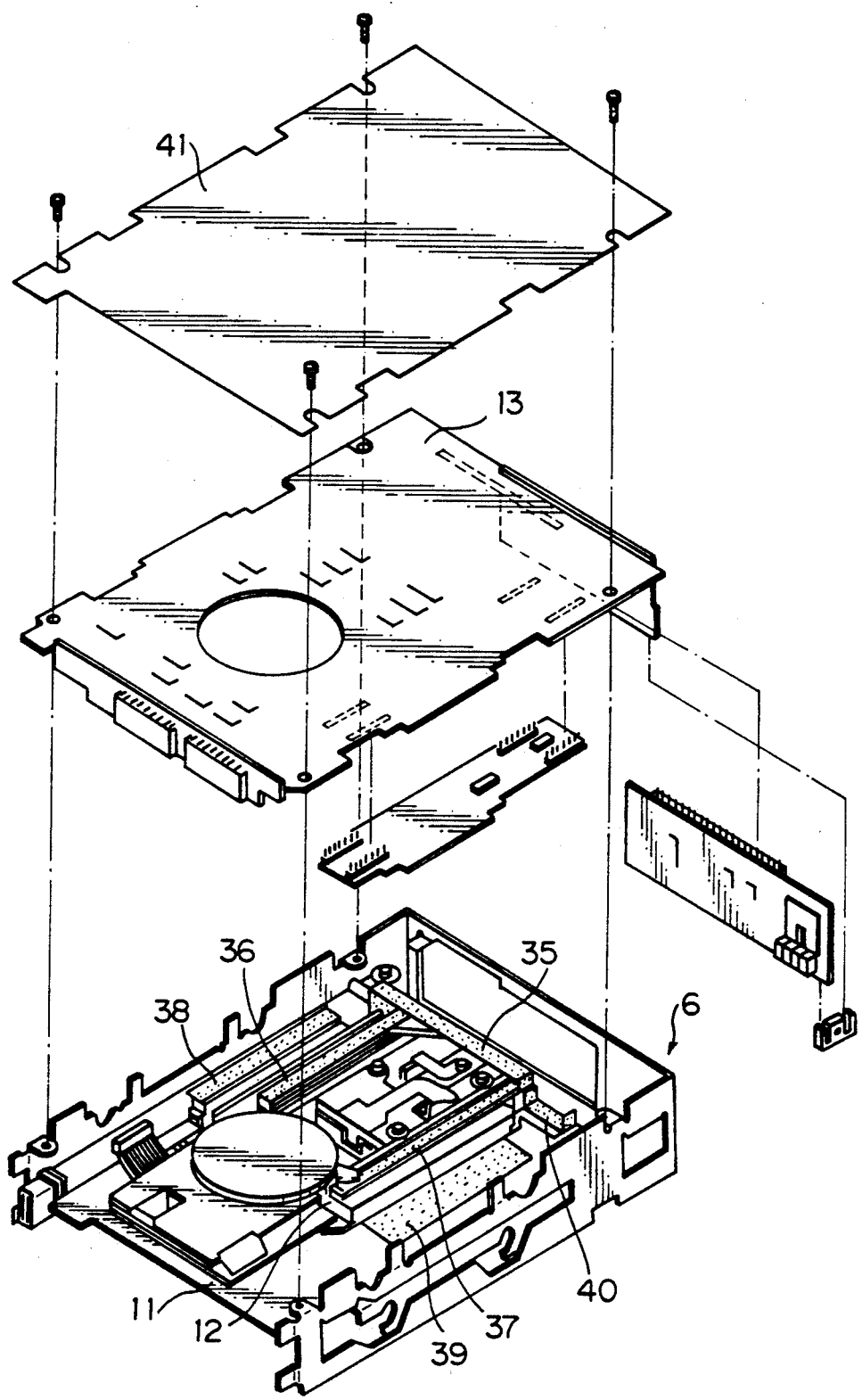

FIG. 10 illustrates a dustproofing structure applied to a gap between the base member 12 and the circuit board 13. Seal members 35, 36 and 37 are disposed on the base member 12 to fill up the gap between the base member 12 and the circuit board 13.

Provided on the backside of the base plate 11 are seal members 38 and 39 for covering an opening of the backside. A dustproofing member 40 is also provided to cover a gap between drive circuit elements on the circuit board 13.

A seal member 41 comprising an insulating material is disposed on the backside of the circuit board 13 to shut-off dust and to prevent short-circuit between circuitry elements.

In the above mentioned embodiment, accordingly, the flow of air which enters into the casing 6 from the aperture 8 and goes around the upper surface of the tray 3a is blocked by the dustproofing members 24 and 26, and the entering of air into the inside of the tray 3a is thus prevented.

When the cartridge 2 is completely loaded on the disk drive motor 4, the cartridge 2 is brought into contact with the seal members 28 and 29. Accordingly, passage of air through the gap between the cartridge 2 and the carrier 27 toward the optical pickup device 5 is blocked off by the seal members 28 and 29. Moreover, since the seal member 28 and 29 correspond to the seal member 20 shown in FIG. 2, as mentioned above, the flow of air is then guided by the seal members 28 and 29 toward portions of the carrier 27 at which the carrier 27 is heated by the heat sources 21 and 22. Therefore, these portions of the carrier 27 are cooled by the flow of air.

Since the gap between the carrier 27 and the base plate 11 is filled up with the dustproofing sheet member 32 and the seal member 33, passage of air through the gap between the carrier 27 and the base plate 11 toward the optical pickup device 5 is blocked off by these members 32 and 33.

Further, since the gap between the base plate 11 and the spindle motor 4 is filled up with the dustproofing member 34, passage of air through this gap toward the optical pickup device 5 is blocked off by the dustproofing member 34.

Furthermore, the gap between the base member 12 and the circuit board 13 is filled up with the seal members 35, 36 and 37, passage of air through this gap toward the optical pickup device 5 is blocked off by the dustproofing member 34. Moreover, various integrated circuits mounted on the circuit board 13 can be cooled by the flow of air guided by the seal members 35 to 37.

In this way, the optical parts such as the objective lens 5a of the optical pickup device 5 are completely sealed against the flow of air within the casing 6, and thus the optical systems of the optical pickup device 5 and the objective lens 5a are prevented from being contaminated by dust contained in the atmosphere.

As the material of the dustproofing sheet members 24, 26, 32, 34, 38 and 39, materials having no permeability such as vinyl chloride may be used. The installation of these sheet members may be performed by using a pressure sensitive adhesive double coated tape.

As the material of the seal members 28, 29, 31, 33, 35, 36 and 37 and the dustproofing member 40, for example, open-cell foamed polyether-urethane foam, polyethylene-urethane foam, or a material having flexibility such as closed-cell foamed polyethylene, sponge, rubber or the like may be used. Alternatively, an air-filter member having a dust-collecting function may be used for these seal and sheet members.

In the case that the open-cell foamed material or the air-filter member is used for the seal members 28, 29, 31, 33, 35, 36 and 37 and the dustproofing member 40, the flow of air can pass through these members 28, 29, 31, 33, 35, 36, 37 and 40. However, in this case, since much of the dust can be removed from the flow of air by means of these members, the damage from dust can be greatly reduced. Especially, in the case that the interior of the casing 6 has to be cooled, as in this embodiment, the use of such open-cell foamed materials is very advantageous, because it is easy to flow a much greater amount of cooling-air into portions which are to be cooled.

FIGS. 11 to 15 show a second embodiment of the present invention, which is characterized by a dustproofing structure applied to a gap which is formed between the door member and the inside of the casing front panel section when the door member is in its open position, as well as a gap which is formed between the cartridge and the inside of the casing front panel section at the side opposite to the door member when the cartridge is loaded on the disk drive motor within the casing.

Figure 11:
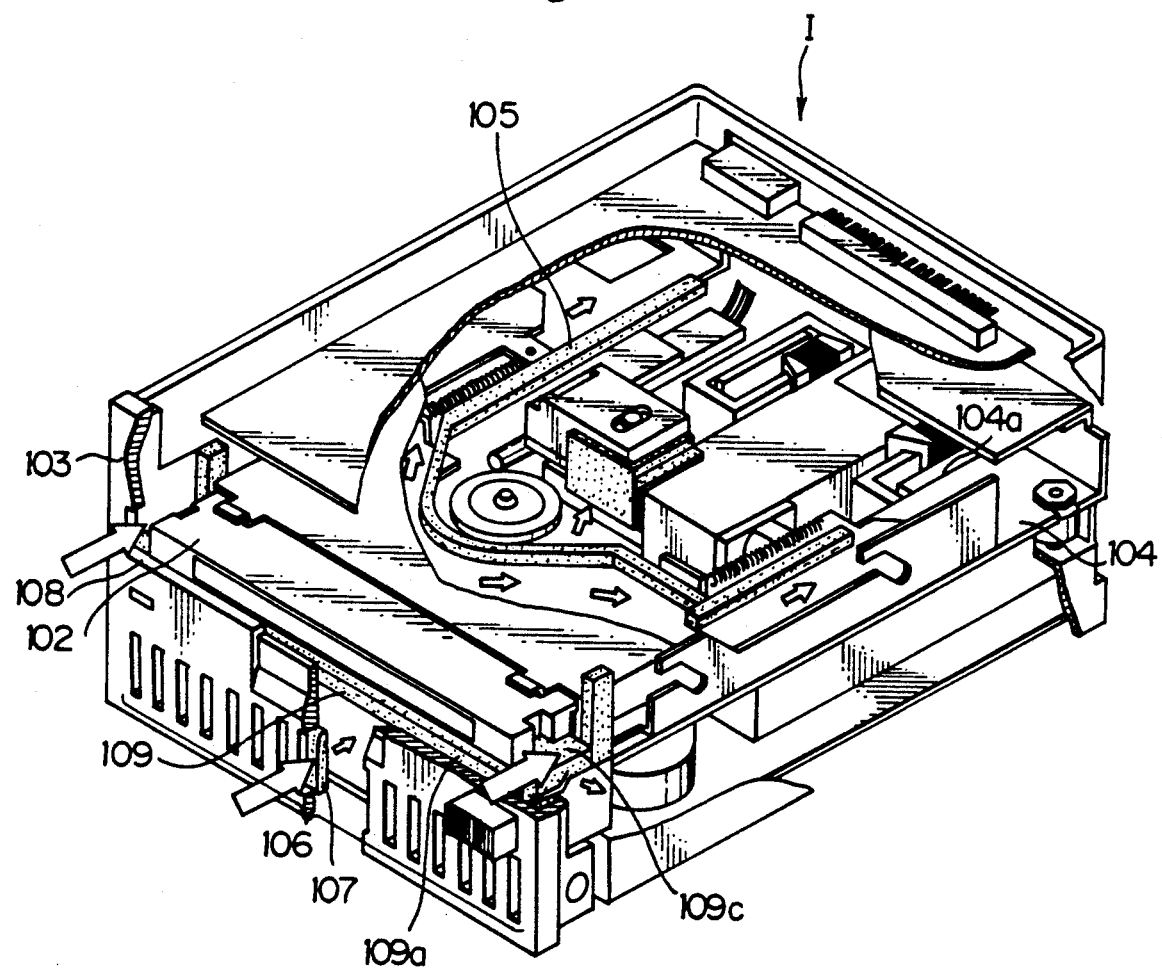
FIG. 11 is a fragmentary perspective view of a second embodiment of an optical disk apparatus constructed in accordance with another aspect of the present invention.

Referring to FIG. 11, the casing 101 of the optical disk apparatus I includes a front panel section 103. A disk cartridge 102 can be accommodated into the casing 101 through a cassette insertion aperture 108 which is formed in the front panel section 103. The interior of the casing 101 is divided into upper and lower regions, and a loading assembly 116 having a tray 116a is disposed in the upper region in the casing 101, while a disk drive motor for rotating an optical disk housed in the cartridge 102, an optical pickup device, and a accessing device for the optical pickup device are disposed in the lower region of the casing 101, similarly to the first embodiment shown in FIGS. 1 to 9.

Provided at the periphery of an opening 104a of the base plate 104 is a base seal member 105 which is adapted to shut off the flow of air from the loading assembly into the opening 104a by contacting the lower surface of the cartridge 102 when the cartridge 102 is loaded on the disk drive motor.

An air-inlet 106 is formed in the front panel section 103 below the cassette insertion aperture 108. At the inside of the front panel section 103, the air-inlet 106 is covered with a filter member 107 for removing dust from air which is to be introduced into the casing 103 from the air-inlet 106.

Disposed on the inside of the front panel section 103 along the lower side of the cassette insertion aperture 108 is a cartridge seal member 109 which is adapted to prevent introduction of air from the aperture 108 into the casing 101 through a spacing between the cartridge 102 and the inside of the front panel section 103 when the cartridge 102 is loaded on the disk drive motor.

Figure 12:
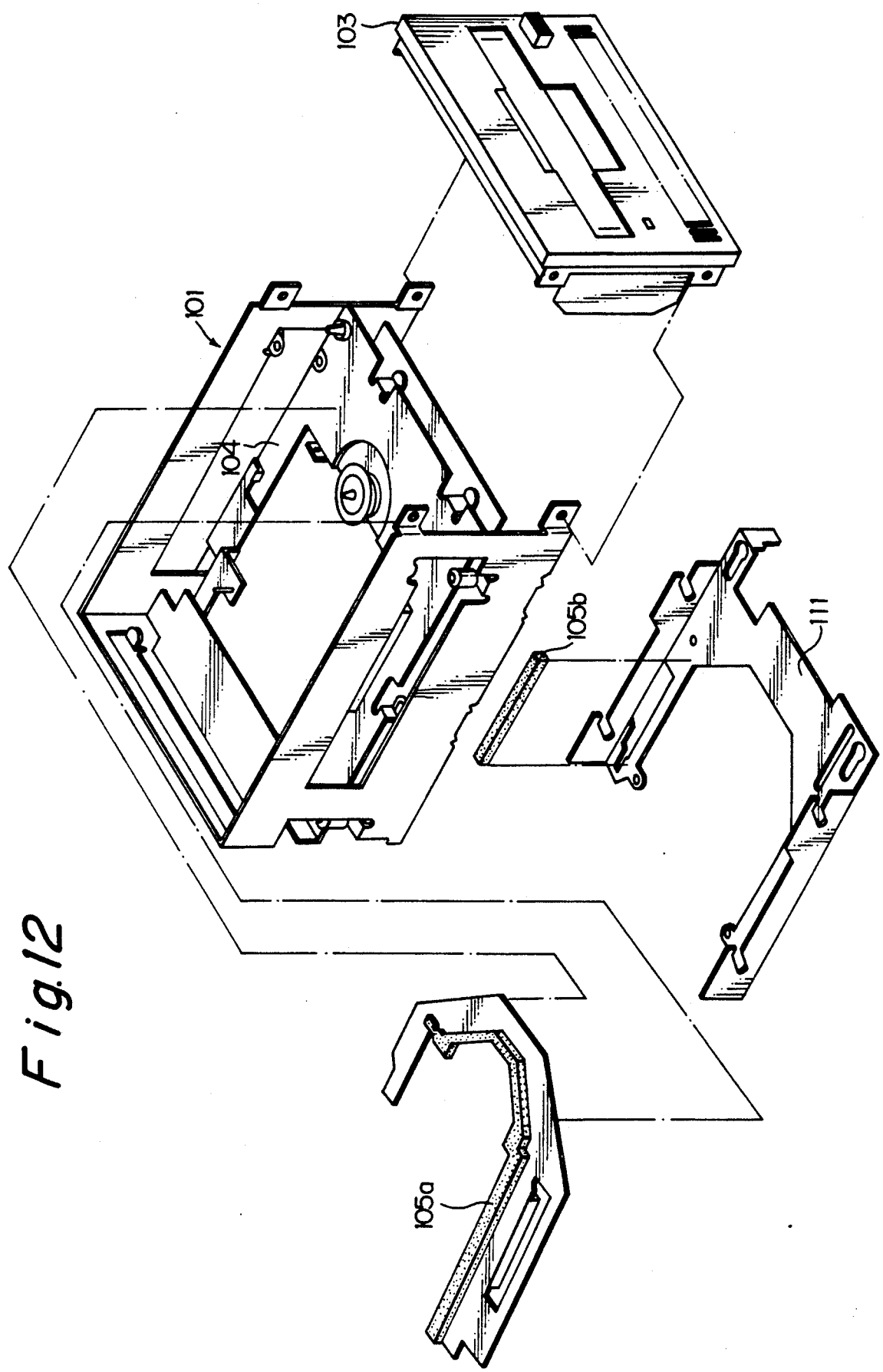
FIG. 12 is an exploded schematic perspective view of parts of the optical disk apparatus shown in FIG. 11, illustrating a base seal member to be attached to a base plate.

As shown in FIG. 12, the base seal member 105 is separated into two sections 105a and 105b, the section 105a being attached to the base member 104, while the section 105b being attached to a carrier 111 which constitutes a part of the loading assembly 116.

Figure 13:
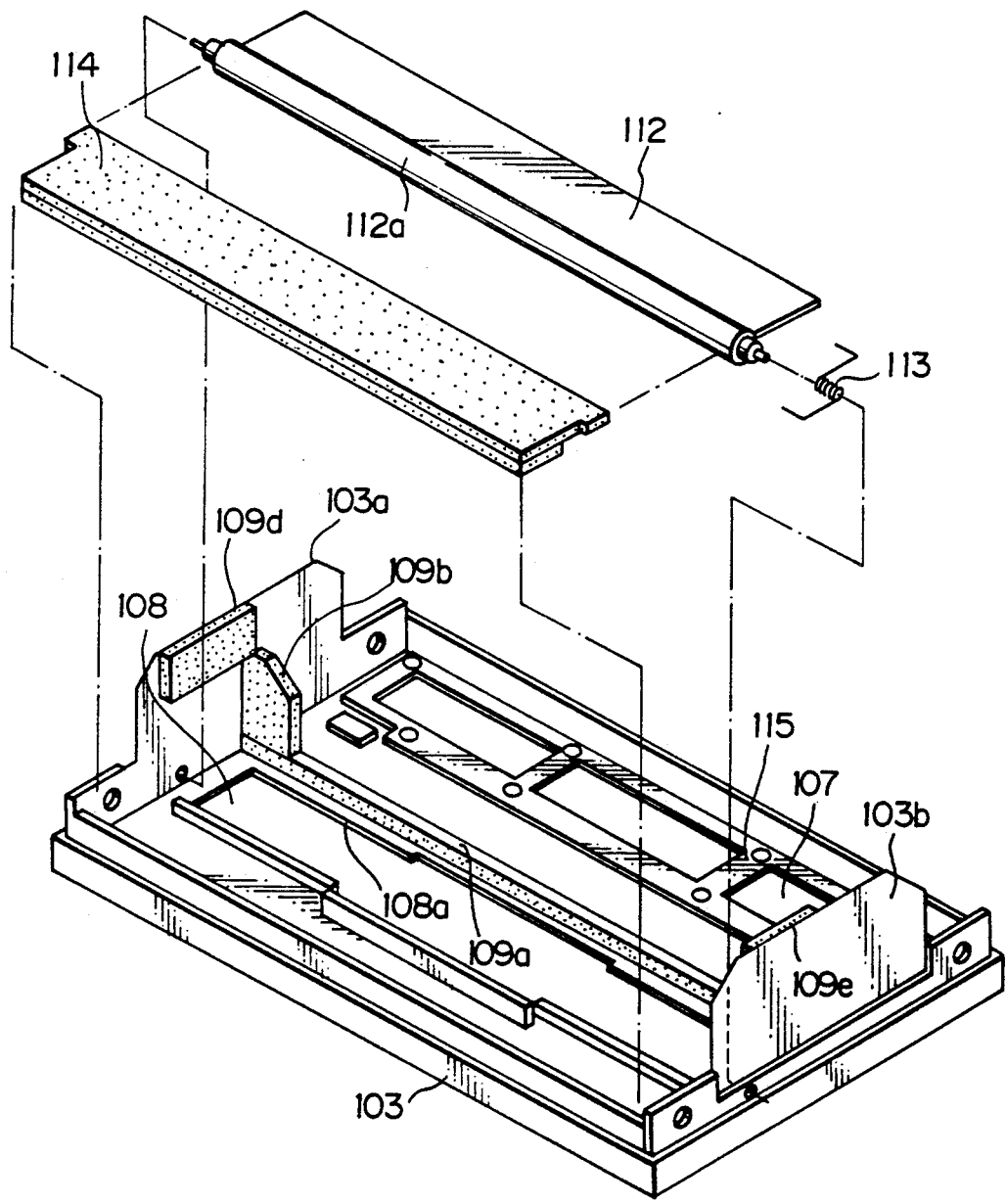
FIG. 13 is an exploded schematic perspective view of parts of the optical disk apparatus shown in FIG. 11, illustrating seal members applied to the front panel section of a casing.

As shown in FIG. 13, the cartridge seal member 109 comprises an elongated frame section or seal member 109a having a square cross-section. The elongated frame section 109a extends in parallel to the lower side 108a of the aperture 108 with a certain distance therebetween and is connected at opposite ends thereof to opposite side plates 103a and 103b of the front panel section 103, respectively. The cartridge seal member 109 further comprises a pair of rear plate sections or seal members 109b and 109c and a pair of side plate sections or seal members 109d and 109e. The rear plate sections 109b and 109c are are connected at their front ends to the opposite ends of the elongated frame section 109a, respectively, and extend rearward with one sides thereof being attached to the inside of the side plates 103a and 103b. The pair of side plate sections 109d and 109e are attached to the side plates 103a and 103b, respectively, and connected at their lower ends to the rear ends of the rear plate sections 109b and 109c, respectively.

A door member 112 for closing the aperture 108 is disposed at the inside of the front panel section 103. The door member 112 has a shaft portion 112a which is pivotally attached at opposite ends thereof to the side plates 103a and 103b, respectively, and urged by a spring 113 to close the aperture 108, as seen from FIG. 13.

Figure 14A:
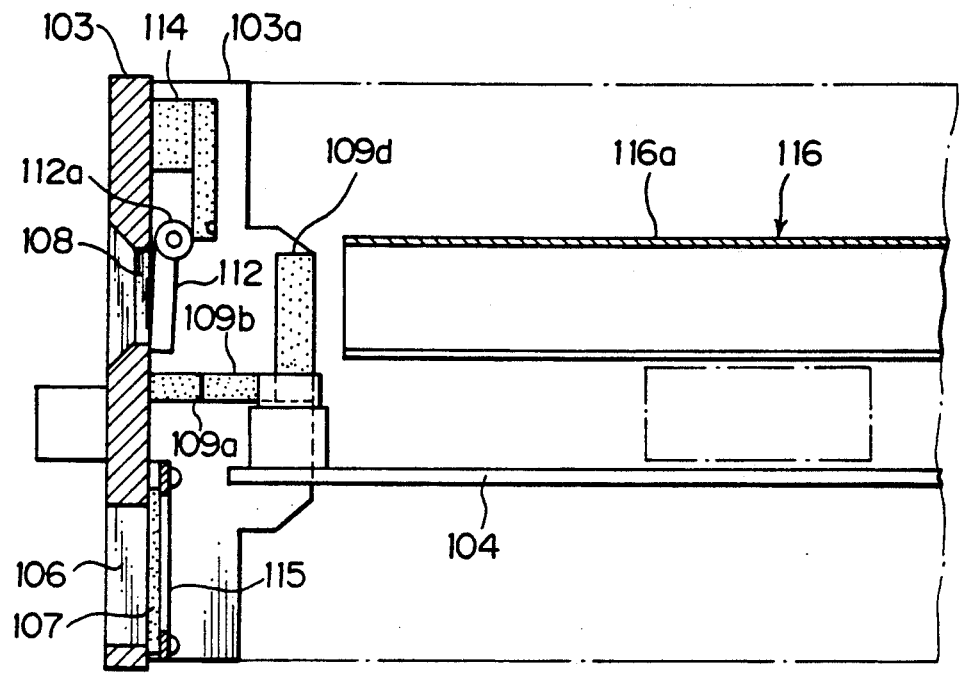
FIGS. 14(a) and 14(b) are cross sectional views for explaining a dust-proof operation of the optical disk apparatus shown in FIG. 11, respectively.

As shown in FIG. 14(a), also disposed on the inner wall of the front panel section 103 above the aperture 108 is a door seal member 114 which is brought into contact with the peripheral surface of the shaft portion 112a of the door member 112. The door seal member 114 is connected at opposite ends thereof to the side plate 103a and 103b, respectively. The filter member 107 is attached to the the front panel section 103 by means of a fixing member 115.

In the above-mentioned construction of the second embodiment, when the cartridge 102 is not inserted into the casing 101, the cassette insertion aperture 108 is closed by the door member 112 urged by the spring 113, while the door seal member 114 is brought into contact with the shaft portion 112a of the door member 112, as shown in FIG. 14(a). In this state, accordingly, introduction of air into the casing 101 from the exterior thereof through the aperture 108 can be prevented.

Figure 14B:
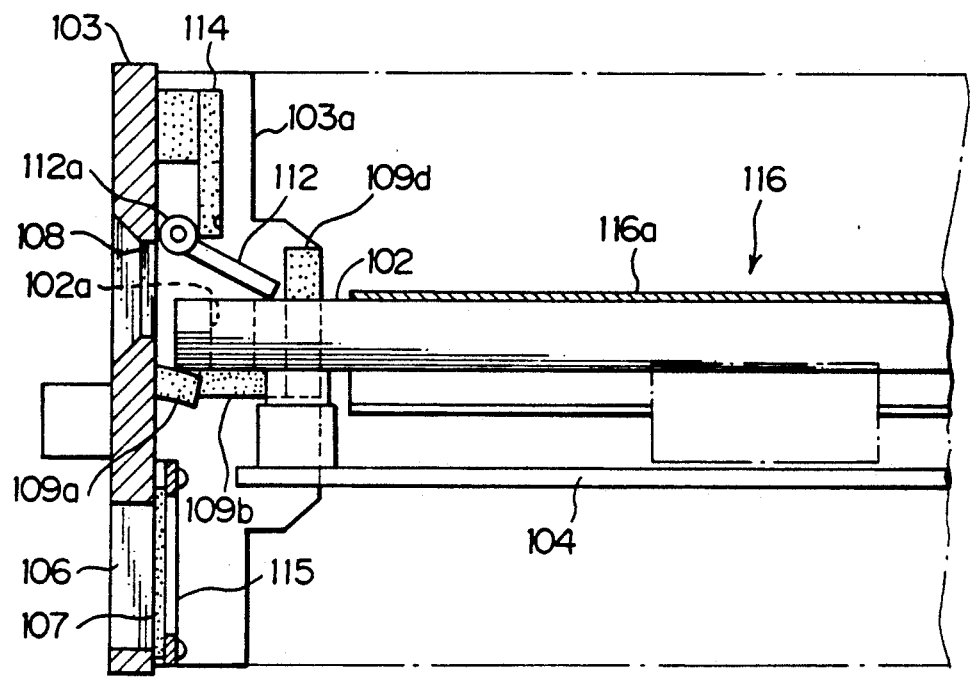
Figure 15:
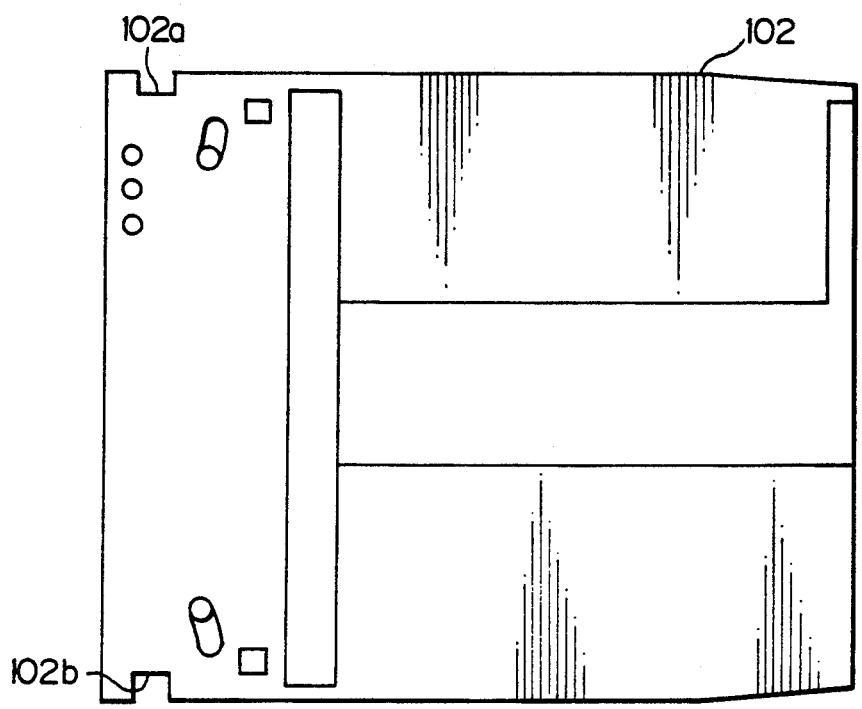
FIG. 15 is a schematical plan view of a disk cartridge as an example.

When the cartridge 102 is inserted into tray 116a of the loading assembly 116 within the casing 102 through the aperture 108, the loading assembly 116 is actuated to move down the cartridge 102 on the disk drive motor, as shown in FIG. 14(b). In this state, the cartridge 102 is brought into contact at its lower front portion with the seal member 109a, and at its side portion with the seal members 109d and 109e.

On the other hand, the cartridge 102 is formed at opposite sides thereof near one end thereof with notches 102a and 102b which are brought into contact with the seal members 109b and 109c, respectively, when the cartridge 102 is loaded on the disk drive motor.

In this way, when the cartridge 102 is loaded on the disk drive motor, the upper surface of the cartridge 102 is sealed against the exterior of the casing 101 at the contact portion of the door member 112 with the cartridge 102, while the lower surface of the cartridge 102 is sealed against the exterior at the contact portion of the seal member 109a with the cartridge. Further, the notches 102a and 102b are sealed with the seal members 109b and 109c.

In the second embodiment, as shown in FIGS. 14(a) and 14(b), since the door seal member 114 is tangentially brought into contact with the shaft portion 112a of the door member 112, a smooth pivotal movement of the door member 112 and a constant seal property are ensured.

As the material of the seal members 109a, 109b, 109c and 109d, the same materials as described with reference to the first embodiment may be used.

In the case that the interior of the casing 101 has to be cooled, as in this embodiment, the use of open-cell foamed materials is very advantageous, because it is easy to flow a much greater amount of cooling-air into portions which are to be cooled.

Figure 16:
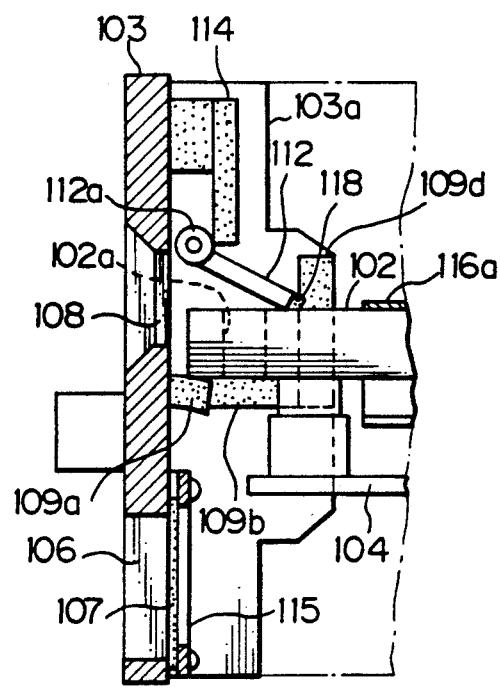
FIGS. 16 and 17 are fragmentary cross sectional views illustrating modifications of the seal structure, respectively.

As shown in FIG. 16, the door member 112 may be provided at its free end with a seal member 118 which is fixed thereto and made of the same material as that of the seal member 109. According to this construction, sealing effect at a contact portion of the door member 112 with the cartridge 102 can be more improved.

Figure 17:
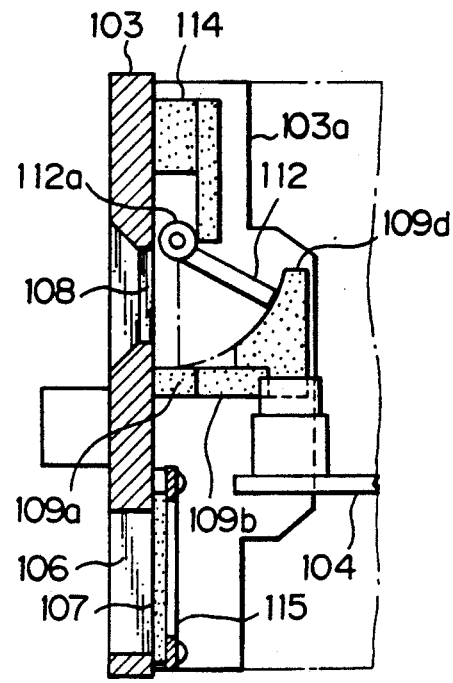

As shown in FIG. 17, the seal members 109d and 109e may be each formed at the front side thereof with a concave portion which is curved in conformity with the moving orbit of the free end of the door member 112. According to this construction, it is possible to locate the seal members 109d and 109e more closely to the aperture 108 in comparison to the aforementioned embodiments. Therefore, the seal members 109d and 109e can be surely brought into contact with the cartridge 102 even when the loading position of the cartridge 102 with respect to the disk drive motor is deviated due to scatter of assembling or machining tolerance.

FIGS. 18 to 22 illustrate a third embodiment of the optical disk apparatus according to the present invention.

Figure 18:
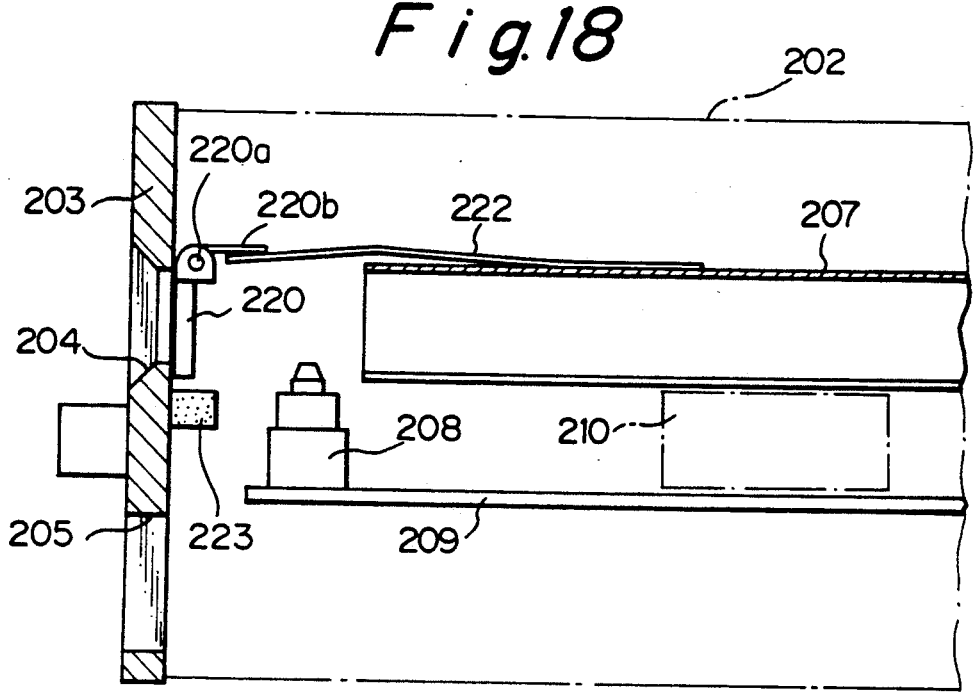
FIG. 18 is a schematic cross sectional view of a third embodiment of the optical disk apparatus constructed in accordance with a third aspect of the present invention, illustrating a door mechanism.
Figure 19A:
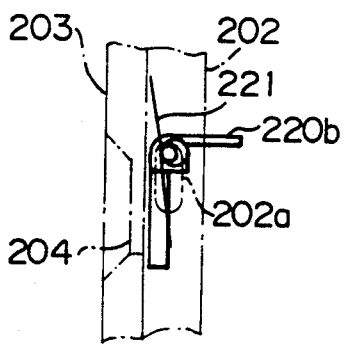
FIGS. 19(a) to 19(d) illustrate operations of the door mechanism shown in FIG. 18, respectively.
Figure 19B:
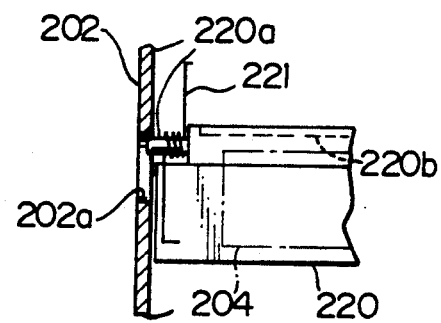
Figure 19C:
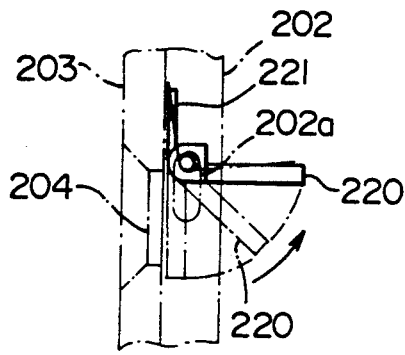
Figure 19D:
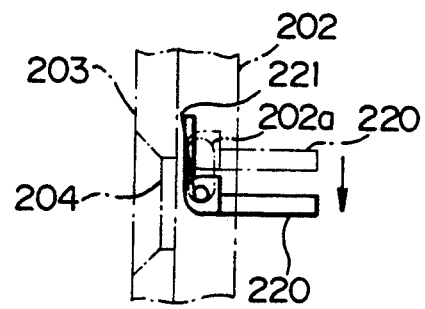

Referring first to FIG. 18, a door 220 is rotatably supported to a casing 202 by means of a shaft 220a protruding at the both ends of the door and is urged toward the direction of blocking a cassette insertion aperture or opening portion 204 of the casing by a spring 221.

A dimension of width of the door 220 is so determined that a gap between the both ends of the door 220 and a side plate of the casing 202 becomes very small.

At the upper end of the door 220, a plate member or engagement portion 220b is formed in such a manner that the engagement portion 220b rises up in the orthogonal direction to a plane of the door 220. An engagement member 222 made of an elastic plate material which engages with the lower side of the engagement portion 220b is provided on the upper face of a tray 207 of a loading assembly.

At the side plate of the casing 202, an engagement hole 202a through which the shaft 220a of the door 220 is inserted extends its longitudinal direction to the direction where the tray 207 moves and is constructed as a long hole having a length in response to the vertical moving quantity of the tray 207.

At a position directly under the opening portion 204 of the front panel 203 at the side of the casing inside, a seal member 223 is provided at a position that its upper end face is slightly higher than the standard height of a height-standard pin 208 and extends to the full length of the width dimension of the front panel 203.

Under the above-described construction, in a state that the cartridge 201 is not loaded, the tray 207 is positioned at the almost same height with the opening portion 204 and the door 220 blocks the opening 204 by the urging force of the spring 221. In this state, the engagement member 222 does not limit the movement of the engagement portion 220b.

Under the above-mentioned state, when the cartridge 201 is inserted from the opening portion 204, the tip end of the cartridge enters from the opening portion 204 to encounter the door 220 and then, releases the door 220 against the urging force of the spring 221. (see FIG. 19(C))

Figure 20:
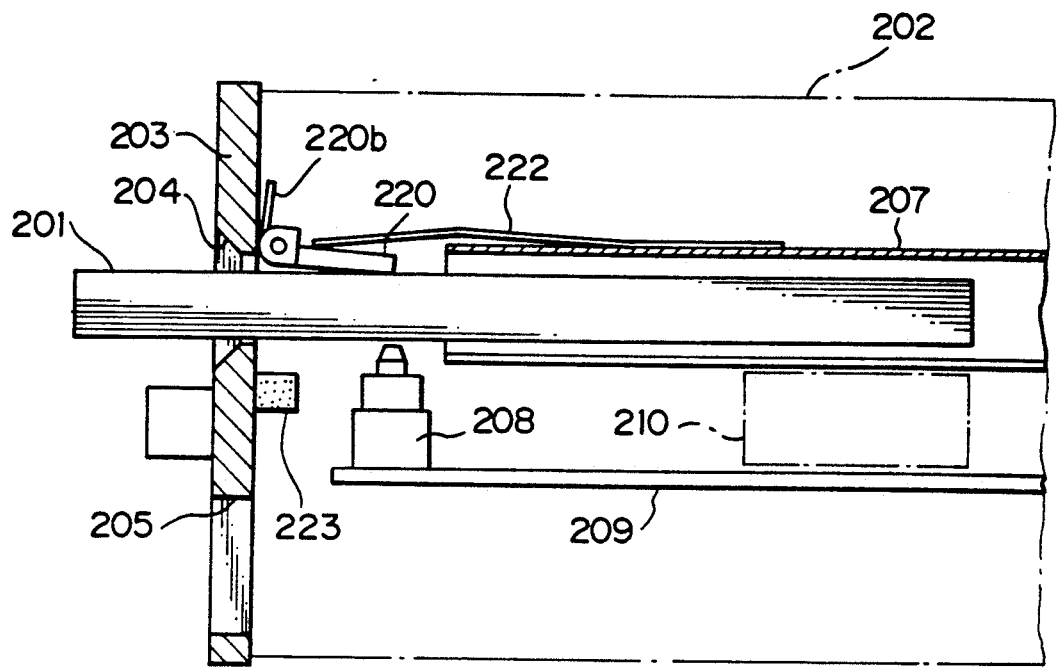
FIG. 20 is a schematic cross sectional view of the optical disk apparatus shown in FIG. 18, illustrating a state that a cartridge is partially inserted into a casing.

Subsequently, as shown in FIG. 20, the cartridge 201 is gradually inserted into the tray 207.

When the insertion quantity of the cartridge 201 is beyond the prescribed value, the cartridge 201 is pulled into the inside of the casing 202 and the tray 207 is lowered by the action of the loading mechanism.

Figure 21:
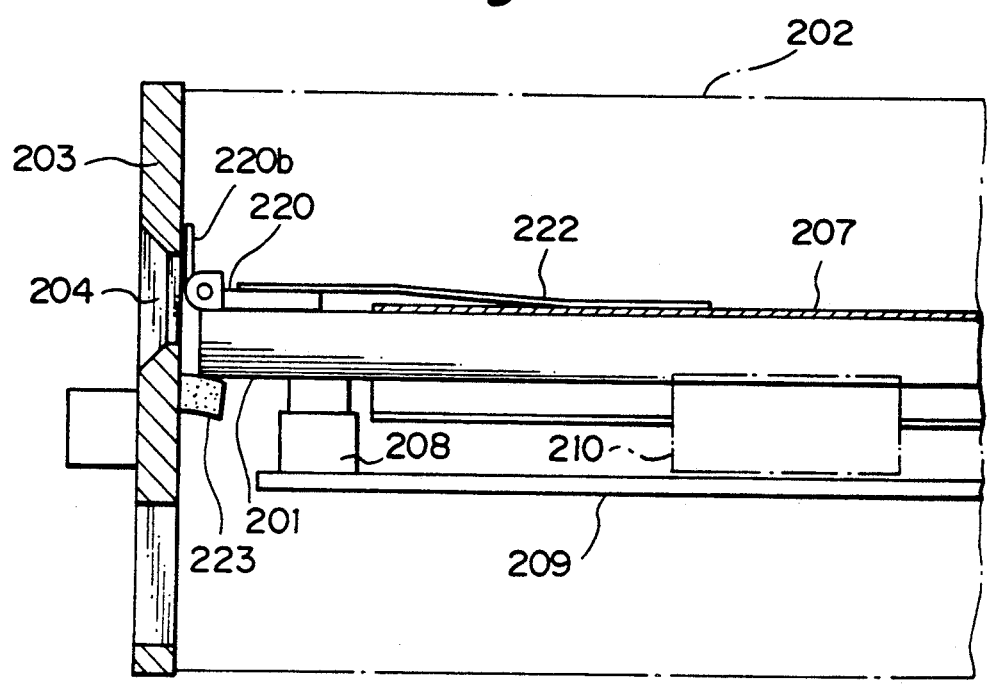
FIG. 21 is a view similar to FIG. 20, illustrating a state that the cartridge is completely inserted into the casing.

Thus, as shown in FIG. 21, the cartridge 201 is positioned in a state that the height of the cartridge 201 is prescribed by the height-standard pin 208. At this time, in accordance with the lowering of the tray 207, the shaft 220a of the door 220 moves along the engagement hole 202a, thereby the door 220 is lowered in interlocking motion with the descent of the tray 207.

In the state that the cartridge 201 is inserted and positioned at a position of a prescribed value, the engagement member 222 presses the back face of the door 220 and the front face of the door 220 contacts the upper face of the cartridge 201, so that the air-tightness of these portions is held. The end portion of the cartridge 201 positioned at the side of the opening portion 204 contacts, at its lower portion, the upper end face of the seal member 223 and the seal member 223 is deformed, whereby the air-tightness of this portion can be maintained.

Figure 22:
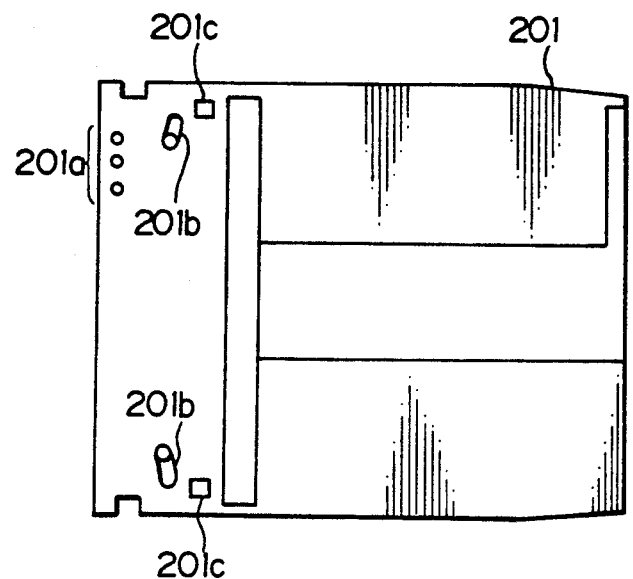
FIG. 22 is a plan view illustrating an example of the cartridge.

As shown in FIG. 22, a disk hole 201a which indicates the kinds of a optical disk housed in the cartridge 201, a write protect nob 1b which designates a prohibition and/or allowance of writing-in of data to the optical disk housed in the cartridge 201 and a hole 201c through which the height standard pin 208 is inserted are formed at the opposite side of the end portion of the cartridge 201 from which the cartridge 201 is inserted.

As mentioned above, the height standard pin 208 is inserted into the hole 201c, so that the air-tightness can be retained at this portion, i.e., an opening portion of the hole 201c. On the other hand, the respective opening portions of the disk hole 201a and the write protect nob 201b are blocked by the door 220, whereby the entry of air through these opening portions can be prevented.

In the present example, the door 220 and the seal member 223 are pressed to the upper and lower faces of the cartridge 201 in a state of the cartridge being housed. Thus, the atmosphere invaded from the opening portion 204 is shut off.

According to the above-described construction, even though outside air is taken in into the casing 202 by using a fan (not shown) for the forced cooling, the this air does not pass through the opening portion 204 and therefore, any attachment of dust and mote on optical parts housed inside of the cartridge can be prevented.

In the step of taking out the cartridge 201, when the tray 207 rises up in accordance with the drawing-out movement, the shaft 220a of the door 220 moves the engagement hole 22a and then, the door 220 rises up with the ascent of the tray 207. Accordingly, the movement of drawing out the cartridge 201 can be conducted appropriately.

Figure 23:
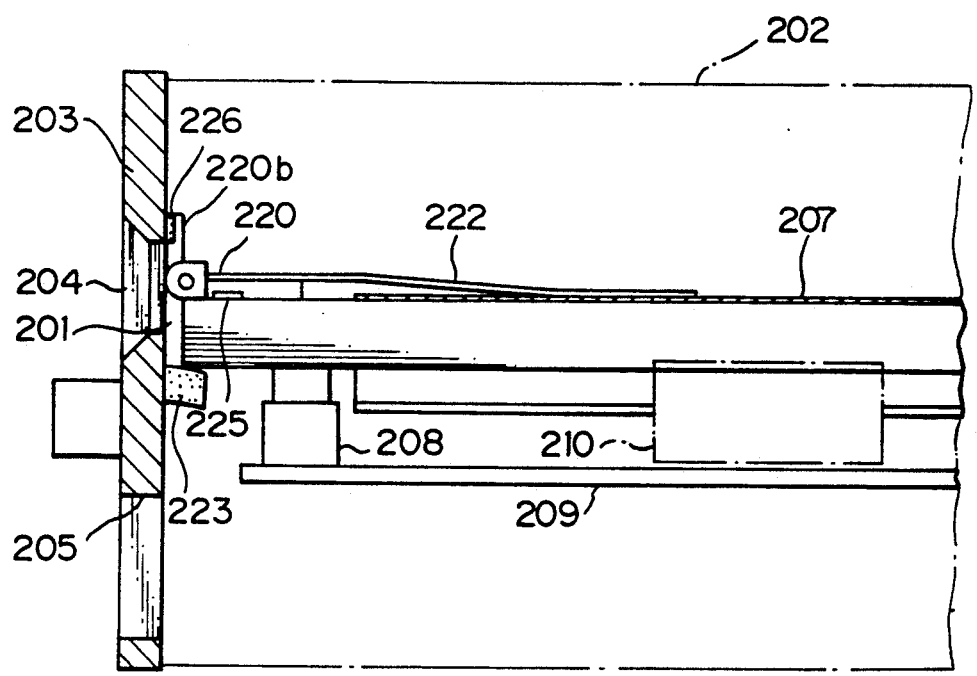
FIG. 23 is a schematic cross sectional view illustrating a modification applied to the door mechanism.
Figure 24:
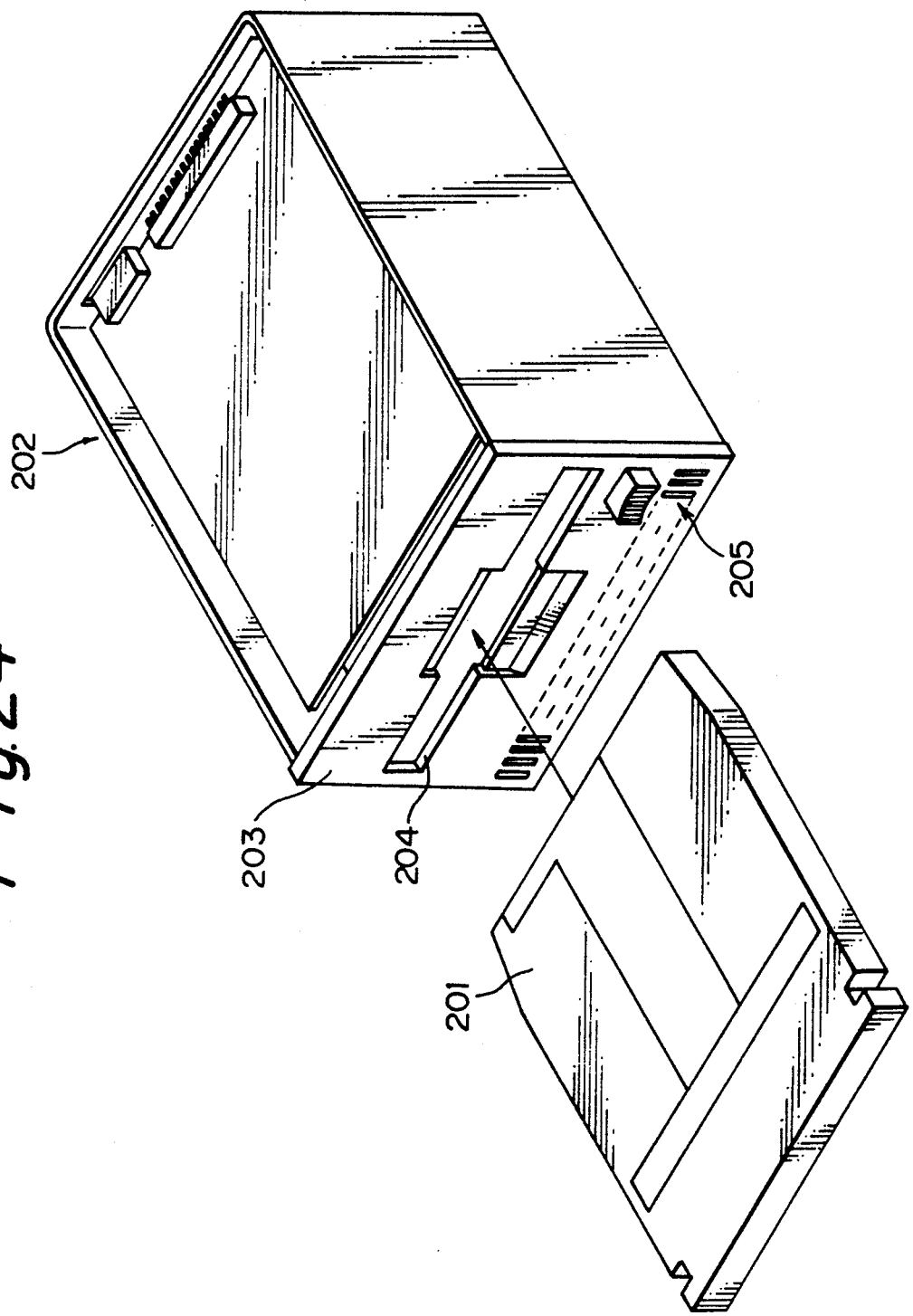
FIG. 24 is a schematic perspective view illustrating an outer appearance of an optical disk apparatus.

FIG. 23 illustrates modification applied to the the door mechanism shown in FIG. 18. In FIG. 23, constituent elements which are the same as those in the embodiment of FIG. 18 are indicated by the same reference numerals.

In this embodiment, a seal member 225 for improving the relationship of close contact between a front face of the door 220 and the cartridge 201 and a seal member 226 for improving the relationship of close contact at a portion where the engagement portion 220b and a face at the inside of the front panel 203 contact, are respectively provided. By the provision of these seal members, the entry of outside air can be efficiently prevented.

As the seal members 223, 225 and 226, for example, open-cell foamed polyether-urethane foam, polyethylene-urethane foam, or a material having flexibility such as closed-cell foamed polyethylene, sponge, rubber or the like may be used. Alternatively, an air-filter member having effects for collecting dust and having the similar properties may be used.

Figure 25:
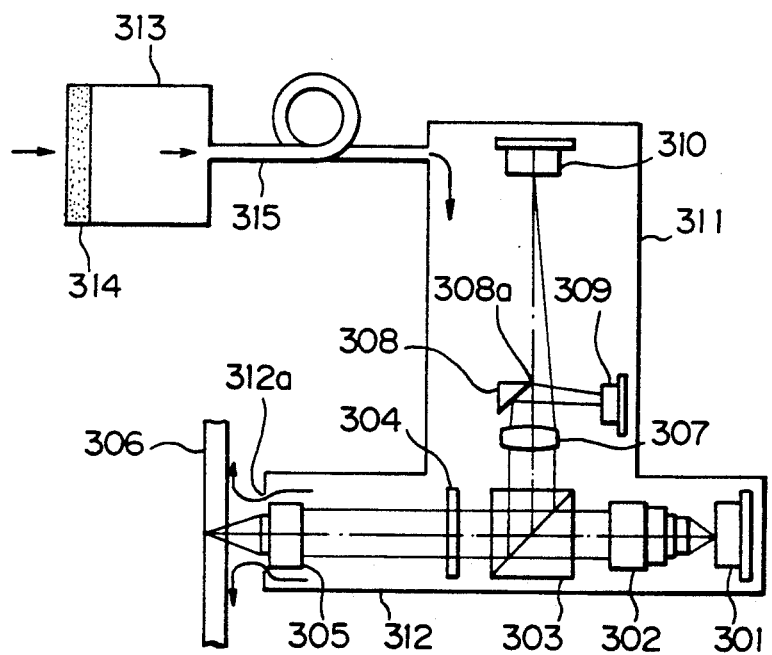
FIGS. 25 and 26 are schematical views for illustrating the construction of an optical system in an optical pickup apparatus constructed in accordance with the fourth aspect of the present invention, respectively.
Figure 26:
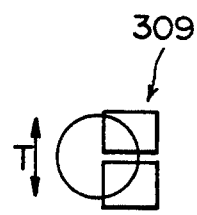
Figure 27:
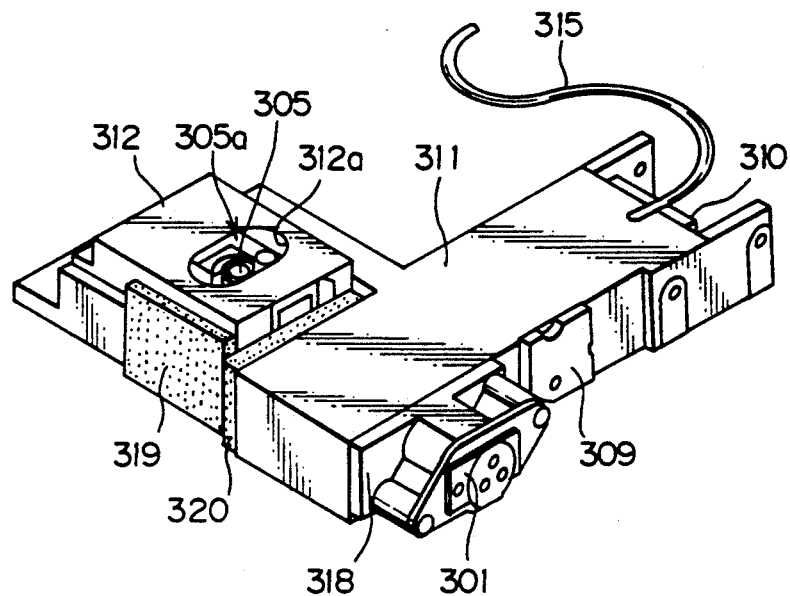
FIG. 27 is a schematical perspective view for illustrating an outer appearance of the apparatus shown in the FIG. 25.

FIGS. 25 to 27 illustrate an optical pickup device constructed in accordance with a fourth aspect of the present invention.

Referring to FIGS. 25 to 27, the optical pickup apparatus are adapted to detect focusing error of a laser beam by the knife-edge method as well as positioning error of a laser beam on a recording track by the push-pull method. Said optical pickup device is integrally constructed and the whole of the device is moved in the radial direction of an optical disk.

A laser beam emitted from a laser diode 301 (semiconductor laser element) is converted to a collimated beam (hereinafter referred to as laser beam) by a coupling lens 302, passes through a polarized-light beam splitter 303, converted to a circle polarized light by a quarter wave plate 304, converged by an objective lens 305 and imaged on a recording track of an optical disk 306.

A reflected light (hereinafter referred to as a signal light) from the optical disk 306 is converted to a substantial collimated light through again the objective lens 305, then passes again through the quarter wave plate 304, converted to a linear polarized light the polarized-light axis of which is orthogonal to the laser beam emitted from the laser diode 301, and reflected in the direction of the lens 307 by the polarized light beam splitter 303.

Almost half of the luminous flux which passes through the lens 307 is reflected by a segmental mirror 308 which forms a knife edge. As shown in FIG. 26, the reflected half luminous flux is incident in a light-receiving element 309 for a tracking servo the light-receiving faces of which ar divided into two in the tracking direction T, i.e., the radial direction of the optical disk 306. The remaining luminous flux is imaged on a light-receiving element 310 for focusing servo the light-receiving faces of which are divided into two by a dividing line parallel to an angle line 308a of the segmental mirror 308.

The objective lens 305 is provided with a tracking mechanism for positioning the objective lens 305 in the radial direction of the optical disk 306 and a focusing mechanism for taking the focus. The both tracking mechanism and focusing mechanism are hereinafter referred to as an objective lens-moving mechanism 305a.

On the basis of a light-receiving signal of the light-receiving element 309, a tracking error signal is formed. On the other hand, a focusing error signal is formed on the basis of a light-receiving signal of the light-receiving element 310. These error signals are fed back to tracking servo systems and to focusing servo systems, respectively.

The objective lens-moving mechanism 305a is controlled by the servo systems and focus point of the objective lens 305 is positioned at the surface of the optical disk 306 as well as a spot which is converged by the objective lens 305 and formed on the surface of the optical disk 306 is positioned at the recording track.

A reproduction signal is formed on the basis of the sum total of light-receiving signals of the light-receiving element 309 and light-receiving signals of the light-receiving element 310. On the basis of the reproduction signal, treatment of recording/reproducing data is conducted.

A optical head casing is constructed of two casings 311 and 312. The casing 311 is an optical system for forming laser beams and treating signal light which is returned from the objective lens 305 is constructed in a closed structure. The casing 312 is connected to the casing 311 and houses the objective lens-moving mechanism 305a therein. The casing 312 is constructed in a closed structure except for a space which is required for moving the objective lens 305.

A portion connecting the casing 11 and the casing 312 is arranged with an optical axis-deflecting element (not shown) in order to conform the optical axis of the laser diode 1 which is in accord with the direction parallel to the surface of the optical disk 306 with an optical axis of the objective lens 305 which is in accord with the direction perpendicular to the surface of the optical disk 306.

An air-intake of an air pump 313 is provided with an air-filter 314 to remove dust and mote contained in the atmosphere. The air-supply of the air-pump 313 is conducted into the casing 311 through an air tube 315 connected therebetween.

Figures 28A, 28B, 28C:
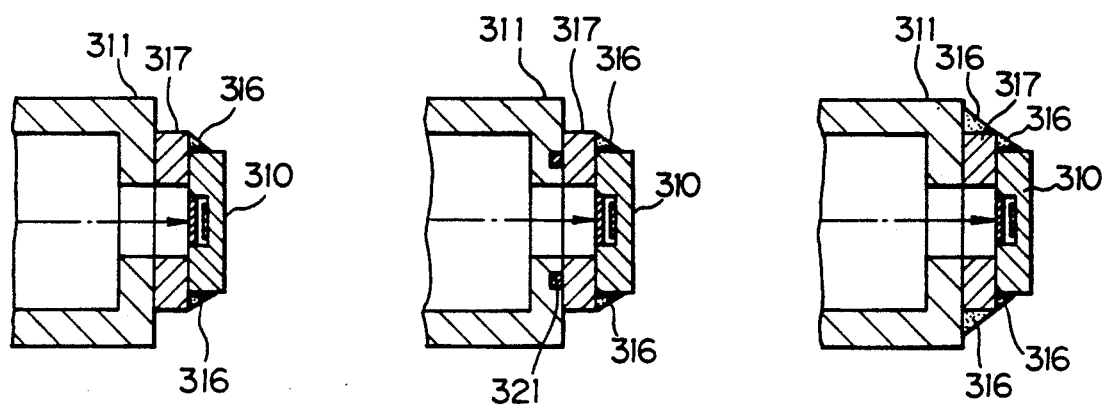
FIGS. 28(a), 28(b), and 28(c) illustrate various modifications of an installation structure of a light-receiving element to a pickup head casing, respectively.

The light-receiving elements 309, 310 are secured to a holder 317 by an adhesive 316, for example, as shown in FIG. 28(a). By securing the holder 317 to the casing 311 the light-receiving element 310 (or 309) is installed on the casing 311 At the time of this installation, a secured position is so adjusted that the installing position of the light-receiving element 310 (or 309) becomes a standard position.

A face where the holder 317 and the casing 311 are installed is worked to be plane having high accuracy and accordingly, any gap is not formed at the installing portion of the casing 311 and the light-receiving elements 309 and 310.

The laser diode 301 and the coupling lens 302 are combined to be constructed as a unit 318. The portion of the casing 311 to which the unit 318 is installed is constructed to be closed structure.

The connecting portion between the casing 311 and the casing 312 is provided with sealing members 319 and 320, and air-tightness is kept thereat.

Thus, the installing portion of the laser diode 301 and the coupling lens 302, the installing portion of the light-receiving elements 309 and 310, and the connecting portion of the casings 311 and 312 are constructed to be closed structure, so that the inside of the casing 311 is complete closed structure with respect to the outside.

In the above-mentioned construction, when the drive of an optical disk apparatus (not shown) starts and the activation of a fan for air-cooling starts, an air-pump is actuated.

Then, the outside air from which dust and mote are removed through an air-filter 314 is sucked into the air-pump 313 and fed into the inside of the casing 311 through an air-tube 315, whereby the insides of the casings 311 and 312 becoming positive state with respect to the atmosphere. Accordingly, the sucked atmosphere by the action of the air-cooling fan is kept from the insides of the casings 311 and 312.

When the optical disk 306 is loaded on the optical disk apparatus and data-access is conducted to the optical disk 306, the clean air supplied to the casings 311 and 312 from the air pump 313 passes through the inside of the objective-lens moving mechanism 305a and the periphery of the objective lens 305, blows from the opening 312a of the casing 312 and is blasted to the surface of the optical disk 306.

Thus, since an air curtain is formed between the objective lens 305 and the surface of the optical disk 306, the attachment of dust and mote on the surface of the optical surface 306 can be prevented.

As described above, according to this embodiment, the entry of outside air into the inside of the casings 311 and 312 can be prevented, thereby keep dust and mote from optical parts as well as mote from the surface of the optical disk 306.

Since the casings 311 and 312 are constructed as a closed structure, the capacity of the air pump 313 which feeds clean air to the inside of the casings 311, 312 can be small, to keep down the cost of the mechanism for keeping out dust.

FIGS. 28(b) and 28(c) illustrate other ways to install the light-receiving elements 309 and 310 to the casing 311 respectively.

The example shown in FIG. 28(b) improves the air-tightness by proving an O-ring between the casing 311 and the holder 317.

The example shown in FIG. 28(c) improves air-tightness of the installing portion by sealing the periphery of the portion of contacting the casing 311 with the holder 317 by means of an adhesive 316.

In the above-described embodiments, the present invention is applied to the optical pickup device which records data on and/or reproduces data from the optical disk. However, it goes without saying that the present invention is similarly applied to an optical pickup device for recording and/or reproduction of data on an optical magnetic disk.

Furthermore, in the above-described embodiments, the present invention maintains air-tightness of the connecting portion between the optical casing and the objective-lens moving casing by providing the seal member on the connecting portion. However, a construction to maintain the air-tightness of the connecting portion is not limited thereto.

Moreover, in the above-described embodiments, the present invention is applied to an optical pickup device which detects focusing error of a laser beam by the knife-edge method and detects positioning error of the laser beam on the recording track by the push-pull method. However, the present invention may be similarly applied to optical pickup device having the other error-detecting mechanisms.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. An optical disk apparatus for an optical disk enclosed in a disk cartridge which is to be detachably inserted thereinto, comprising:
   a casing for accommodating the cartridge through a cassette insertion aperture formed therein;
   a disk drive motor for rotating the optical disk in the cartridge about the center thereof within the casing;
   a loading assembly for detachably loading the cartridge on the disk drive motor within the casing;
   an optical pickup device for recording data on and/or reproducing data from the optical disk; and
   an U-shaped deflecting means disposed behind the cassette insertion aperture and extending to an air outlet positioned on a back of the casing, said U-shaped deflecting means partially surrounding the optical pick up device and the disk drive motor and guides the air flowing into the casing along outer edges of said U-shaped deflecting means for protecting the optical pick up device and the disk drive motor from dust contained in the air flow.

2. The apparatus of claim 1, wherein the sealing means comprises:
   a cartridge-surface seal member which is adapted to block passage of air advancing toward the optical pickup device along the surface of the cartridge at the side of the optical pickup device when the cartridge is loaded on the disk drive motor; and
   loading seal members which are adapted to block passage of air advancing toward the optical pickup device along the surface of the loading assembly.

3. The apparatus of claim 1, wherein the casing is provided therein with a mounting base for mounting thereon the disk drive motor and the optical pickup device, the mounting base being adapted to generally separate the interior of the casing into two sections, the loading assembly being disposed in one of the sections and opposing the disk drive motor and the optical pickup device through an opening formed in the mounting base.

4. The apparatus of claim 3, wherein the sealing means comprises:
   a cartridge-surface seal member which is adapted to block passage of air advancing toward the optical pickup device along the surface of the cartridge at the side of the optical pickup device when the cartridge is loaded on the disk drive motor;
   loader seal members which together are adapted to block passage of air advancing toward the optical pickup device through internal gaps of the loading assembly and a gap between the loading assembly and the mounting base; and
   a motor seal member which is adapted to block passage of air advancing toward the optical pickup device through a gap between the disk drive motor and the mounting base.

5. The apparatus of claim 1, wherein the casing is provided at the inside thereof with a door member for closing the cassette insertion aperture of the casing, the door member being pivotally supported on the casing and urged with spring means toward its aperture-closing position from its aperture-opening position so as to be pivotally moved from its aperture-closing position to its aperture-opening position by means of the cartridge against the force of the spring means when the cartridge is inserted into the casing through the cassette insertion aperture, the apparatus further comprising:
   door seal members which together are adapted to form an air-seal between the door member and the casing when the door is in its aperture-opening position and the cartridge is loaded on the disk drive motor; and
   cartridge seal members which are adapted to form an air-seal between the cartridge and the casing at the side opposite to the door member when the door is in its aperture-opening position and the cartridge is loaded on the disk drive motor.

6. The apparatus of claim 5, wherein the door member is brought into surface contact with the cartridge when the door member is in its aperture-opening position, and is movable along the direction of the movement of the cartridge between its loaded and unloaded positions with respect to the disk drive motor,
   the loading assembly being provided with a pushing member which is adapted to push the door member together with the cartridge in the same direction when the cartridge is loaded on the disk drive motor,
   and wherein the door member is further provided with a plate member which extends radially from the pivotal axis of the door member in a direction perpendicular to the door member so as to be brought into surface contact with the inside of the casing when the door member is in its aperture-opening position and thereby to close the cassette insertion aperture when the cartridge is loaded on the disk drive motor.

7. The apparatus of claim 1, wherein:

the casing is provided at the inside thereof with a door member for closing the cassette insertion aperture of the casing, the door member being pivotally supported on the casing and urged with spring means toward its aperture-closing position from its aperture-opening position so as to be pivotally moved from its aperture-closing position to its aperture-opening position by means of the cartridge against the force of the spring means when the cartridge is inserted into the casing through the cassette insertion aperture, the door member being brought into surface contact with the cartridge when the door member is in its aperture-opening position and being movable along the direction of moving of the cartridge between its loaded and unloaded positions with respect to the disk drive motor, the loading assembly being provided with a pushing member which is adapted to push the door member together with the cartridge in the same direction when the cartridge is loaded on the disk drive motor, and wherein the door member is further provided with a plate member which extends radially from the pivotal axis of the door member in a direction perpendicular to the door member so as to be brought into surface contact with the inside of the casing when the door member is in its aperture-opening position and thereby to close the cassette insertion aperture when the cartridge is loaded on the disk drive motor.

8. The apparatus of claim 1, wherein the optical pickup device comprises an optical head casing and an optical system accommodated in the optical head casing, the optical head casing being connected with air-supply means for supplying pressurized air into the optical head casing to maintain the interior of the optical head casing at a pressure higher than the exterior thereof.

9. The apparatus of claims 8, wherein the optical system includes an objective lens for focusing a light beam emitted from a light source on the optical disk through an aperture formed in the optical head casing, the objective lens being adapted to be moved in the optical head casing to perform tracking and focusing servo-control, the pressurized air being continuously discharged from the interior of the optical head casing toward the exterior thereof through a gap between the objective lens and the aperture of the optical head casing.

10. The apparatus of claim 1, wherein the casing includes front and rear panel sections which are opposite to each other, the cassette insertion aperture being formed in the front panel section which is further formed with an air-inlet for introducing air into the casing through a dust-filter, the rear panel section being formed with an air-outlet for discharging air from the interior of the casing to the exterior thereof.

11. An optical disk apparatus for an optical disk enclosed in a disk cartridge which is to be detachably inserted thereinto, comprising;

a casing for accommodating the cartridge through a cassette insertion aperture formed therein;

a disk drive motor for rotating the optical disk in the cartridge about the center thereof within the casing;

a loading assembly for detachably loading the cartridge on the disk drive motor within the casing;

an optical pickup device, having an optical system, for recording data on and/or reproducing data from the optical disk through the optical system; and a door member for closing the cassette insertion aperture of the casing, the door member being pivotally supported on the casing and urged with spring means toward its aperture-closing position from its aperture-opening position so as to be pivotally moved from its aperture-closing position to its aperture-opening position by means of the cartridge against the force of the spring means when the cartridge is inserted into the casing through the cassette insertion aperture, the door member being brought into substantially parallel surface contact with the cartridge when the door member is in its aperture-opening position and being movable along the direction of moving of the cartridge between its loaded and unloaded positions with respect to the disk drive motor, the loading assembly being provided with a pushing member which is adapted to push the door member together with the cartridge in the same direction when the cartridge is loaded on the disk drive motor, and wherein the door member is further provided with a plate member which extends radially from the pivotal axis of the door member in a direction perpendicular to the door member so as to be brought into surface contact with the inside of the casing when the door member is in its aperture-opening position and thereby to close the cassette insertion aperture when the cartridge is loaded on the disk drive motor.

* * * * *

UNITED STATES PATENT AND TRADEMARK OFFICE
CERTIFICATE OF CORRECTION

PATENT NO. : 5,086,422

DATED : February 4, 1992

INVENTOR(S) : HAGIYA, et al.

It is certified that error appears in the above-identified patent and that said Letters Patent is hereby corrected as shown below:

Title page, left-hand column, at item "[75]", "Toshimichi Hagiya" should read --Tosimichi Hagiya--.

Signed and Sealed this

Twentieth Day of July, 1993

Attest:

MICHAEL K. KIRK

Attesting Officer

Acting Commissioner of Patents and Trademarks